US012584032B2

(12) United States Patent
Kaji et al.

(10) Patent No.: US 12,584,032 B2
(45) Date of Patent: Mar. 24, 2026

(54) REACTION LIQUID AND INK JET RECORDING METHOD

(71) Applicant: CANON KABUSHIKI KAISHA, Tokyo (JP)

(72) Inventors: Mamiko Kaji, Kanagawa (JP); Maki Motomura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 130 days.

(21) Appl. No.: 18/513,733

(22) Filed: Nov. 20, 2023

(65) Prior Publication Data

US 2024/0174880 A1 May 30, 2024

(30) Foreign Application Priority Data

| Nov. 25, 2022 | (JP) | 2022-188255 |
| Nov. 25, 2022 | (JP) | 2022-188256 |
| Oct. 30, 2023 | (JP) | 2023-185683 |

(51) Int. Cl.
*C09D 11/54* (2014.01)
*B41J 2/01* (2006.01)
(Continued)

(52) U.S. Cl.
CPC ................. *C09D 11/54* (2013.01); *B41J 2/01* (2013.01); *B41J 2/2114* (2013.01); *B41J 2/2146* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 6,086,197 A * 7/2000 Kubota ..................... B41J 2/15
347/100
6,740,689 B1 5/2004 Lee et al.
(Continued)

FOREIGN PATENT DOCUMENTS

| EP | 4011989 A1 | 6/2022 |
| JP | 2004-512987 A | 4/2004 |

(Continued)

OTHER PUBLICATIONS

European Search Report issued in corresponding European Application No. 23210378.8 dated Apr. 15, 2024.

*Primary Examiner* — Manish S Shah
(74) *Attorney, Agent, or Firm* — Venable LLP

(57) ABSTRACT

Provided is a reaction liquid for ink jet, which can record a high-quality image and is excellent in intermittent ejection stability, to be used together with an aqueous ink. The reaction liquid for ink jet is used in an ink jet recording method including recording an image on a recording medium with an aqueous ink and an aqueous reaction liquid containing a reactant that reacts with the aqueous ink. The reaction liquid includes a polyvalent metal salt and a surfactant. The surfactant is a compound including a hydrophilic moiety having an anionic group and a hydrophobic moiety that is an aliphatic hydrocarbon group. A mass ratio of a content (% by mass) of the polyvalent metal salt in the reaction liquid to a content (% by mass) of the surfactant therein is 10.0 times or more to 35.0 times or less.

16 Claims, 1 Drawing Sheet

(51) Int. Cl.
  *B41J 2/21* (2006.01)
  *B41M 5/00* (2006.01)
  *C09D 11/30* (2014.01)
  *C09D 11/38* (2014.01)

(52) U.S. Cl.
  CPC ........... *B41M 5/0017* (2013.01); *C09D 11/30* (2013.01); *C09D 11/38* (2013.01)

(58) Field of Classification Search
  CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033
  See application file for complete search history.

(56) References Cited

U.S. PATENT DOCUMENTS

| | | | |
|---|---|---|---|
| 7,066,590 B2 | 6/2006 | Lee et al. | |
| 7,328,990 B2 | 2/2008 | Iinuma | |
| 8,025,384 B2 | 9/2011 | Ogasawara et al. | |
| 9,624,395 B2 | 4/2017 | Kaji et al. | |
| 9,981,480 B2 | 5/2018 | Imai et al. | |
| 10,245,847 B2 | 4/2019 | Matsuzaki | |
| 10,688,787 B2 | 6/2020 | Kaji et al. | |
| 10,710,365 B2 | 7/2020 | Takebayashi et al. | |
| 10,864,748 B2 | 12/2020 | Imai et al. | |
| 10,870,770 B2 | 12/2020 | Sakai et al. | |
| 11,654,693 B2 | 5/2023 | Saito et al. | |
| 11,827,033 B2 | 11/2023 | Yamashita et al. | |
| 11,833,838 B2 | 12/2023 | Motomura et al. | |
| 2004/0189775 A1 | 9/2004 | Lee et al. | |
| 2005/0157131 A1 | 7/2005 | Iinuma | |
| 2006/0125895 A1* | 6/2006 | Nito | B41J 2/175 347/100 |
| 2009/0185019 A1 | 7/2009 | Ogasawa et al. | |
| 2009/0234067 A1* | 9/2009 | Kariya | C09D 11/32 524/610 |
| 2010/0201737 A1* | 8/2010 | Kariya | C09D 11/32 347/21 |
| 2016/0024323 A1* | 1/2016 | Tamai | C09D 11/322 106/31.6 |
| 2016/0311235 A1* | 10/2016 | Takeuchi | B41J 2/01 |
| 2018/0086112 A1 | 3/2018 | Matsuzaki | |
| 2023/0312966 A1 | 10/2023 | Willems et al. | |

FOREIGN PATENT DOCUMENTS

| | | | |
|---|---|---|---|
| JP | 2005-205611 A | 8/2005 |
| JP | 2009-196351 A | 9/2009 |
| JP | 2018-053124 A | 4/2018 |
| WO | 02/36696 A2 | 5/2002 |

* cited by examiner

REACTION LIQUID AND INK JET RECORDING METHOD

BACKGROUND OF THE INVENTION

Field of the Invention

The present invention relates to a reaction liquid and an ink jet recording method.

Description of the Related Art

As a method of recording an image by an ink jet system, there has hitherto been proposed a two-component reaction system using an ink and a reaction liquid containing a reactant that is brought into contact with the ink to thicken the ink (Japanese Patent Application Laid-Open No. 2004-512987 and Japanese Patent Application Laid-Open No. 2005-205611). A polyvalent metal salt, an organic acid and a cationic resin are each commonly used as the reactant. Of those reactants, the polyvalent metal salt is suitably used because the polyvalent metal salt can efficiently reduce the movement of a coloring material and record a high-quality image.

SUMMARY OF THE INVENTION

The inventors of the present invention have investigated recording an image by an ink jet system with the reaction liquid proposed in the above-mentioned patent literatures. As a result, it has been found that, when the reaction liquid is ejected again after the ejection of the reaction liquid is temporarily suspended, a reduction in ejection property, that is, a reduction in intermittent ejection stability occurs.

Accordingly, an object of the present invention is to provide a reaction liquid for ink jet, which can record a high-quality image and is excellent in intermittent ejection stability, to be used together with an aqueous ink. In addition, another object of the present invention is to provide an ink jet recording method using the reaction liquid.

That is, according to the present invention, there is provided a reaction liquid for ink jet to be used in an ink jet recording method including recording an image on a recording medium with an aqueous ink and an aqueous reaction liquid containing a reactant that reacts with the aqueous ink, the reaction liquid including: a polyvalent metal salt; and a surfactant, wherein the surfactant is a compound including a hydrophilic moiety having an anionic group and a hydrophobic moiety that is an aliphatic hydrocarbon group, and wherein a mass ratio of a content (% by mass) of the polyvalent metal salt in the reaction liquid to a content (% by mass) of the surfactant therein is 10.0 times or more to 35.0 times or less.

Further features of the present invention will become apparent from the following description of exemplary embodiments with reference to the attached drawings.

DESCRIPTION OF THE EMBODIMENTS

Figure 1:
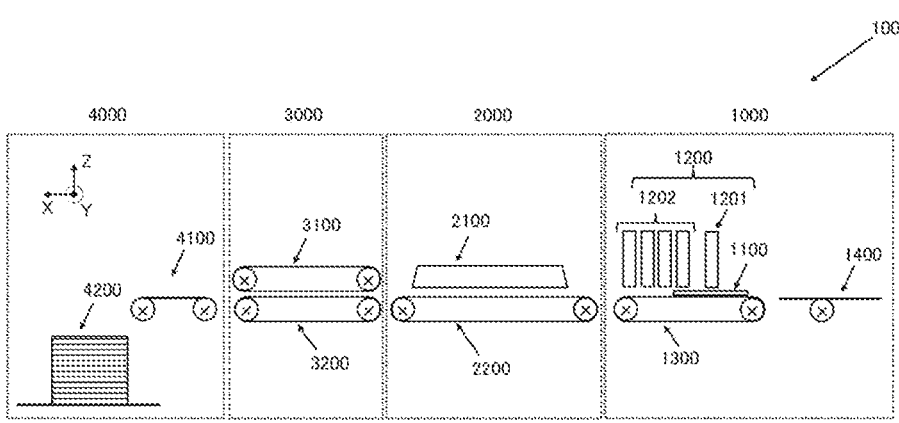
FIG. 1 is a schematic view for illustrating an ink jet recording apparatus according to one embodiment of the present invention.

The present invention is described in more detail below by way of exemplary embodiments. In the present invention, when a compound is a salt, the salt is present as dissociated ions in an ink, but the expression "contain a salt" is used for convenience. In addition, an aqueous ink and reaction liquid for ink jet are sometimes referred to simply as "ink" and "reaction liquid". Physical property values are values at normal temperature (25° C.), unless otherwise stated. The descriptions "(meth)acrylic acid" and "(meth)acrylate" refer to "acrylic acid or methacrylic acid" and "acrylate or methacrylate", respectively.

An ink jet recording method is a method of recording an image by ejecting a liquid, such as an ink or a reaction liquid, from a recording head of an ink jet system to cause the liquid to adhere to a recording medium, and is required to further improve image quality. Under such situation, a particularly important issue is the improvement of intermittent ejection stability. When an attempt is made to eject the liquid again from an ejection orifice of the recording head after the ejection of the liquid from the ejection orifice is temporarily suspended, the ejection of a first drop of the liquid becomes unstable or the ink is not ejected, with the result that an image may be smudged or have defects.

The inventors have investigated the quality of an image recorded by the ink jet recording method through use of an ink and a reaction liquid containing a polyvalent metal salt. As a result, it has been found that, when the reaction liquid is ejected again after the ejection of the reaction liquid is temporarily suspended, the intermittent ejection stability of the reaction liquid is reduced, and smudging and the like are liable to occur on an image to be recorded. Further, it has also been found that such phenomenon occurs specifically when the reactant is a polyvalent metal salt.

In order to improve the quality of an image to be recorded by causing the reaction liquid to rapidly spread in a wet state on a recording medium when being brought into contact with the recording medium, a surfactant is usually added to the reaction liquid. When the inside of an ink flow path communicating to the ejection orifice of the recording head filled with the reaction liquid was observed with a microscope, it was found that an oil droplet-like product was generated in the ink flow path over time after the ejection of the reaction liquid was suspended. When the ejection of the reaction liquid is suspended, a liquid component such as water in the reaction liquid is evaporated, and a component of the reaction liquid is highly concentrated locally on a gas-liquid interface in the ink flow path. In the reaction liquid in which the amount of an ion component is large through the dissolution of a polyvalent metal salt, the dissolution state of the surfactant is liable to become unstable. Thus, it is conceived that the reduction in intermittent ejection stability is caused by the following: the surfactant that is highly concentrated locally cannot be fully dissolved in a liquid medium in the reaction liquid and is precipitated into an oil droplet-like state.

Based on the cause for the reduction in intermittent ejection stability, the inventors have investigated the composition of the reaction liquid. As a result, it has been found that it is appropriate to use a compound including a hydrophilic moiety having an anionic group and a hydrophobic moiety that is an aliphatic hydrocarbon group as the surfactant that is caused to coexist with the polyvalent metal salt. Thus, it has been found that the precipitation of the surfactant on the gas-liquid interface in the vicinity of the ejection orifice is less liable to occur, and the intermittent ejection stability of the reaction liquid is easily improved.

When a surfactant is added to water, the surfactant is oriented on the gas-liquid interface to reach a predetermined concentration or more, and in this stage, a spherical micelle including a hydrophobic moiety facing inward and a hydrophilic moiety facing outward (water side) is formed. It is conceived that the ease of micelle formation is determined by: the compatibility between the hydrophilic moiety of the surfactant and the component in the reaction liquid containing water; the compatibility between hydrophobic moieties of the surfactant; and the balance between the hydrophilic moiety and the hydrophobic moiety.

When a surfactant including a hydrophilic moiety having an anionic group and a hydrophobic moiety that is an aliphatic hydrocarbon group is used, the anionic group electrostatically interacts with a highly charged polyvalent metal salt. It is conceived that, because of the electrostatic interaction, the compatibility between the hydrophilic moiety of the surfactant and the polyvalent metal salt is improved. In addition, the aliphatic hydrocarbon group that is the hydrophobic moiety of the surfactant has a strong intermolecular force. It is conceived that, because of the strong intermolecular force, the hydrophobic moieties of the surfactant are stably present, and the compatibility between the hydrophobic moieties is satisfactory. In addition to the use of the specific surfactant, it is required that the mass ratio of the content (% by mass) of the polyvalent metal salt in the reaction liquid to the content (% by mass) of the surfactant therein be 10.0 times or more to 35.0 times or less. It is conceived that, when the requirement is satisfied, the balance between the hydrophilic moiety and the hydrophobic moiety is adjusted, a stable micelle is formed, and the precipitation of the surfactant is suppressed, with the result that the intermittent ejection stability is improved.

Reaction Liquid

The reaction liquid of the present invention is a reaction liquid for ink jet to be used in an ink jet recording method including recording an image on a recording medium with an aqueous ink and an aqueous reaction liquid containing a reactant that reacts with the aqueous ink. The reaction liquid of the present invention includes a polyvalent metal salt and a surfactant. The surfactant is a compound including a hydrophilic moiety having an anionic group and a hydrophobic moiety that is an aliphatic hydrocarbon group. In addition, the mass ratio of the content (% by mass) of the polyvalent metal salt in the reaction liquid to the content (% by mass) of the surfactant therein is 10.0 times or more to 35.0 times or less. Respective components to be used in the reaction liquid and the like are described in detail below.

Reactant

The reaction liquid is brought into contact with the ink to react with the ink, to thereby aggregate components (a resin, a surfactant, and a component having an anionic group such as a self-dispersible pigment) in the ink. The reaction liquid contains the reactant. When the reactant is present, at the time of contact between the ink and the reactant in the recording medium, the state of presence of the component having an anionic group in the ink is destabilized and hence the aggregation of the ink can be accelerated. Examples of the reactant may include: a polyvalent metal ion; a cationic component such as a cationic resin; and an organic acid. The reactants may be used alone or in combination thereof.

A polyvalent metal ion is used as the reactant. Examples of the polyvalent metal ion for forming the polyvalent metal salt may include: divalent metal ions, such as $Ca^{2+}$, $Cu^{2+}$, $Ni^{2+}$, $Mg^{2+}$, $Sr^{2+}$, $Ba^{2+}$ and $Zn^{2+}$; and trivalent metal ions, such as $Fe^{3+}$, $Cr^{3+}$, $Y^{3+}$ and $Al^{3+}$. A water-soluble polyvalent metal salt (which may be a hydrate) made up of the polyvalent metal ion and an anion bonded to each other may be used to incorporate the polyvalent metal ion into the reaction liquid. In the reaction liquid, at least part of the water-soluble polyvalent metal salt is present in a state of being dissociated into a polyvalent metal ion and an anion. The polyvalent metal ion that is the reactant and the anionic group in the ink interact with each other to form a cross-linked structure between anion components in the ink. Thus, the viscosity of the ink is abruptly increased to suppress the movement of a coloring material and a high-quality image can be recorded.

A polyvalent metal ion having a strong aggregation property, which is strongly subjected to an ion reaction with an anionic group, such as a pigment or a resin particle in the ink, is preferably used as the polyvalent metal ion. The polyvalent metal ion is preferably at least one kind selected from the group consisting of: $Mg^{2+}$; $Ca^{2+}$; and $Al^{3+}$, more preferably $Mg^{2+}$ out of those polyvalent metal ions. That is, the polyvalent metal salt is preferably a magnesium salt. $Mg^{2+}$ has a small ion radius and strong polarizability among divalent metal ions. Thus, when $Mg^{2+}$ is used, a more stable micelle structure is formed due to the strong force for polarizing the anionic group of the surfactant, with the result that the intermittent ejection stability can be further improved.

Examples of the anion for forming the polyvalent metal salt may include: inorganic anions, such as $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $PO_4^{3-}$, $HPO_4^{2-}$ and $H_2PO_4^-$; and organic anions, such as $HCOO^-$, $(COO^-)_2$, $COOH(COO^-)$, $CH_3COO^-$, $CH_3CH(OH)COO^-$, $C_2H_4(COO^-)_2$, $C_6H_5COO^-$, $C_6H_4(COO^-)_2$ and $CH_3SO_3^-$. $NO_3^-$, $SO_4^{2-}$ and $Cl^-$ are preferably used from the viewpoint of solubility, and $SO_4^{2-}$ is particularly preferably used from the viewpoint of corrosion resistance. That is, the polyvalent metal salt is preferably a sulfuric acid salt of a polyvalent metal. Through use of the sulfuric acid salt of the polyvalent metal, the ejection stability when the reaction liquid is ejected for a long period of time can be further improved.

When the polyvalent metal ion is used as the reactant, its content (% by mass) in terms of polyvalent metal salt in the reaction liquid is preferably 1.00% by mass or more to 20.00% by mass or less with respect to the total mass of the reaction liquid. In this specification, when the polyvalent metal salt is a hydrate, the "content (% by mass) of the polyvalent metal salt" in the reaction liquid means the "content (% by mass) of the anhydride of the polyvalent metal salt" obtained by removing water serving as a hydrate.

The mass ratio of the content (% by mass) of the polyvalent metal salt in the reaction liquid to the content (% by mass) of the specific surfactant therein is 10.0 times or more to 35.0 times or less. When the mass ratio is less than 10.0 times, the amount of the surfactant that has not interacted with the polyvalent metal is relatively increased, and a micelle is not easily formed. Thus, the surfactant becomes liable to be precipitated, and the intermittent ejection stability of the reaction liquid is reduced. Meanwhile, when the mass ratio is more than 35.0 times, the amount of the surfactant becomes relatively small, and a micelle is not easily formed. Thus, the surfactant becomes liable to be precipitated, and the intermittent ejection stability of the reaction liquid is reduced. In addition, in this case, the surface tension of the reaction liquid is not easily decreased sufficiently, making it difficult for the reaction liquid to be adapted to the recording medium, and the quality of an image to be recorded may be reduced.

It is preferred that the mass ratio of the content (% by mass) of the polyvalent metal salt in the reaction liquid to the content (% by mass) of the specific surfactant therein be 10.0 times or more to 20.0 times or less. When the mass ratio falls within the above-mentioned range, a more stable micelle is formed, and hence the precipitation of the surfactant is further suppressed. In particular, the mass ratio is more preferably 13.0 times or more to 20.0 times or less. When the mass ratio falls within the above-mentioned range, the balance between the content of the polyvalent metal and the content of the specific surfactant that interacts with the polyvalent metal is satisfactory, and a micelle is efficiently formed, with the result that the intermittent ejection stability is particularly easily improved.

Surfactant

A compound (anionic surfactant) including a hydrophilic moiety having an anionic group and a hydrophobic moiety that is an aliphatic hydrocarbon group is used as the surfactant. Based on the total mass of the reaction liquid, the content (% by mass) of the surfactant in the reaction liquid is preferably 0.20% by mass or more to 3.00% by mass or less, more preferably 0.30% by mass or more to 1.50% by mass or less from the viewpoint of further improvements of image quality of an image and suppression of precipitation. In particular, the content (% by mass) of the surfactant in the reaction liquid is particularly preferably 0.50% by mass or more to 1.50% by mass or less.

An example of the anionic group may be at least one kind selected from the group consisting of: a carboxylic acid group; a carboxylic acid ester group; a sulfonic acid group; a sulfate ester group; a phosphoric acid group; a phosphoric acid ester group; a phosphonic acid group; and a phosphonic acid ester group. Each of those anionic groups may form a salt with an alkali metal ion, an ammonium ion or an organic ammonium ion. The hydrophilic moiety may be, for example, any one of an alkylene group, an amide group, a sulfonyl group, an imino group, a carbonyl group, an ester group, an ether group or an alkylene oxide group having each of those anionic groups, and a group formed by combining the above-mentioned groups.

The anionic group in the surfactant is preferably a sulfonic acid group or a sulfate ester group. The anionic surfactant strongly interacts electrostatically with the polyvalent metal ion and easily forms a micelle having an anionic group facing outward (water side). In addition, the sulfonic acid group and the sulfate ester group are each more easily subjected to ionic dissociation and each have a larger ion radius as compared to other anionic groups. Because of this, the bias of an electron cloud easily occurs, the polarizability becomes high, and the anionic surfactant is likely to strongly interact with the polyvalent metal ion. Thus, a more stable micelle structure is easily formed, with the result that the intermittent ejection stability is more easily improved.

The anionic group in the surfactant is more preferably a sulfate ester group. The surfactant having a sulfate ester group has high water solubility. Thus, such surfactant is less liable to be precipitated and particularly easily improves the intermittent ejection stability. When the surfactant having a sulfate ester group is represented as an acid form (H-form), there may be given, for example, a polyoxyethylene alkyl ether sulfuric acid and an alkyl sulfate.

Examples of the aliphatic hydrocarbon group may include linear, branched and cyclic aliphatic hydrocarbon groups. However, the aliphatic hydrocarbon group does not have an aromatic ring. Specific examples of the aliphatic hydrocarbon group may include an alkyl group, an alkenyl group, an alkynyl group, a cycloalkyl group and a cycloalkenyl group.

The aliphatic hydrocarbon group in the surfactant is preferably an alkyl group having 6 or more to 16 or less carbon atoms. The surfactant having an alkyl group having 6 or more to 16 or less carbon atoms has satisfactory balance between hydrophilicity and hydrophobicity, and can more stably form a micelle structure including a hydrophobic moiety facing inward.

The aliphatic hydrocarbon group in the surfactant is preferably an alkyl group having a branched structure. An alkyl group having a branched structure can form a more compact and stable micelle structure because the group has a carbon chain length substantially smaller than that of a linear alkyl group even under the condition that the number of carbons is the same. Examples of the anionic surfactant having the alkyl group having a branched structure may include: a sulfonic acid salt and a sulfate ester salt of a branched alcohol, such as sodium 7-ethyl-2-methyl-4-undecyl sulfate and sodium 2-ethylhexyl sulfate; and a dialkyl sulfosuccinic acid sodium salt.

Specific examples of the surfactant represented as an acid form (H-form) may include an alkyl sulfonic acid, a polyoxyethylene alkyl ether sulfuric acid, a polyoxyethylene lauryl ether sulfuric acid salt, an alkyl sulfate ester, an alkyl taurine, an alkyl sulfoacetic acid, a carboxylated polyoxyethylene alkyl ether, an alkyl phosphoric acid, a polyoxyethylene alkyl ether phosphoric acid, an alkyl phosphoric acid ester, an aliphatic carboxylic acid, a polyoxyethylene alkyl ether carboxylic acid, an N-acyl sarcosine and an N-acyl glutamic acid.

Aqueous Medium

The reaction liquid is an aqueous reaction liquid containing at least water as an aqueous medium. Examples of the aqueous medium to be used in the reaction liquid may include the same examples as those of an aqueous medium that can be incorporated into the ink to be described later. The content (% by mass) of the water-soluble organic solvent in the reaction liquid is preferably 1.00% by mass or more to 50.00% by mass or less with respect to the total mass of the reaction liquid. In addition, the content (% by mass) of the water in the reaction liquid is preferably 1.00% by mass or more to 95.00% by mass or less with respect to the total mass of the reaction liquid.

First Water-Soluble Organic Solvent Having Specific Dielectric Constant of 35 or More to 110 or Less It is preferred that the water-soluble organic solvent in the reaction liquid include a first water-soluble organic solvent having a specific dielectric constant of 35 or more to 110 or less. The magnitude of a specific dielectric constant has a correlation with the magnitude of polarity. A water-soluble organic solvent having a low specific dielectric constant is not easily polarized because the polarity thereof is also low. Accordingly, it is conceived that, in a reaction liquid in which the amount of an ion component is large through the dissolution of a polyvalent metal salt, the water-soluble organic solvent having a low specific dielectric constant does not easily interact with water, and the dissolution state becomes unstable, with the result that the water-soluble organic solvent is liable to be separated from an aqueous medium. Meanwhile, it is conceived that, although a water-soluble organic solvent having an excessively high specific dielectric constant is polarized, such water-soluble organic solvent easily interacts with an ion component in a reaction liquid in which the amount of an ion component is large through the dissolution of a polyvalent metal salt, and hence the water-soluble organic solvent is liable to be brought into a separated or non-uniform presence state. When the reaction liquid contains a first water-soluble organic solvent having a specific dielectric constant of 35 or more to 110 or less together with a polyvalent metal salt, the precipitation of the surfactant on the gas-liquid interface in the vicinity of an ejection orifice is less liable to occur, and the intermittent ejection stability of the reaction liquid can be further improved. In particular, the specific dielectric constant of the first water-soluble organic solvent is more preferably 45 or more to 60 or less, particularly preferably 45 or more to 59 or less. When the specific dielectric constant falls within the above-mentioned ranges, the first water-soluble organic solvent strongly interacts with a polyvalent metal ion, and hence can particularly improve the intermittent ejection stability of the reaction liquid.

It is preferred that the content (% by mass) of the first water-soluble organic solvent having a specific dielectric constant of 35 or more to 110 or less in the reaction liquid be 10.00% by mass or more to 30.00% by mass or less based on the total mass of the reaction liquid. When the content of the first water-soluble organic solvent falls within the above-mentioned range, the intermittent ejection stability can be further improved.

Examples of the first water-soluble organic solvent having a specific dielectric constant of 35 or more to 110 or less may include 1-(2-hydroxyethyl)-2-pyrrolidone (38), ethylene glycol (40), glycerin (42), γ-butyrolactone (42), trehalose (49), dimethyl sulfoxide (49), ethylene urea (50), sorbitol (59), ethyl isopropyl sulfone (59), xylitol (59) and urea (110), where the numbers in the parentheses represent the specific dielectric constants. In particular, a water-soluble organic solvent that has a vapor pressure lower than that of water at 25° C. or is a solid at 25° C. is preferred.

The specific dielectric constant of the water-soluble organic solvent or water may be measured with a dielectric constant meter (e.g., product name "BI-870" (manufactured by Brookhaven Instruments Corporation)) under the condition of a frequency of 10 kHz. The specific dielectric constant of a water-soluble organic solvent that is a solid at a temperature of 25° C. is defined as a value obtained by measuring the specific dielectric constant of a 50% by mass aqueous solution, followed by calculation from the following expression (A). In general, the "water-soluble organic solvent" means a liquid, but in the present invention, those which are solids at 25° C. (normal temperature) are also encompassed in the water-soluble organic solvent.

$$\varepsilon_{sol}=2\varepsilon_{50\%}-\varepsilon_{water} \tag{A}$$

$\varepsilon_{sol}$: specific dielectric constant of a water-soluble organic solvent that is a solid at 25° C.

$\varepsilon_{50\%}$: specific dielectric constant of a 50% by mass aqueous solution of a water-soluble organic solvent that is a solid at 25° C.

$\varepsilon_{water}$: specific dielectric constant of water

Specific examples of the water-soluble organic solvent that is a solid at 25° C., which is commonly used in an ink and a reaction liquid, may include 1,6-hexanediol, trimethylolpropane, ethylene urea, urea, polyethylene glycol having a number-average molecular weight of 1,000, sorbitol, xylitol and trehalose. The reason for the calculation of the specific dielectric constant of the water-soluble organic solvent that is a solid at 25° C. from the specific dielectric constant of the 50% by mass aqueous solution is as described below. Some of the water-soluble organic solvents that are solids at 25° C., which may serve as constituent components of an ink and a reaction liquid, have difficulty in preparing an aqueous solution having a high concentration of more than 50% by mass. Meanwhile, in an aqueous solution having a low concentration of 10% by mass or less, the specific dielectric constant of water becomes dominant, and it is difficult to obtain a probable (effective) value of the specific dielectric constant of the water-soluble organic solvent. In view of the foregoing, the inventors have made investigations to find that an aqueous solution to be measured can be prepared for most of the water-soluble organic solvents that are solids at 25° C. used in an ink and a reaction liquid, and a specific dielectric constant to be calculated is consistent with the effect of the present invention. For the above-mentioned reason, the specific dielectric constant of a water-soluble organic solvent that is a solid at 25° C. calculated from the specific dielectric constant of a 50% by mass aqueous solution is used in the present invention. Regarding water-soluble organic solvents that are solids at 25° C., each of which has too low solubility in water to prepare a 50% by mass aqueous solution, an aqueous solution having a saturation concentration is utilized, and the value of a specific dielectric constant calculated in accordance with the above-mentioned case of calculating $\varepsilon_{sol}$ is used for convenience.

Specific examples of the water-soluble organic solvent (including specific examples of the first water-soluble organic solvent) may include: monohydric alcohols having 1 to 4 carbon atoms, such as methanol (33), ethanol (24), n-propanol (12), isopropanol (18), n-butanol, sec-butanol and tert-butanol; dihydric alcohols, such as 1,2-propanediol (29), 1,3-butanediol (30), 1,4-butanediol (31), 1,5-pentanediol (27), 1,2-hexanediol (15), 1,6-hexanediol (7), 2-methyl-1,3-propanediol (28), 3-methyl-1,3-butanediol (24), 3-methyl-1,5-pentanediol (24) and 2-ethyl-1,3-hexanediol (19); polyhydric alcohols, such as 1,2,6-hexanetriol (29), glycerin (42), trimethylolpropane (34), trimethylolethane, sorbitol (59), xylitol (59) and trehalose (49); alkylene glycols, such as ethylene glycol (40), diethylene glycol (32), triethylene glycol (23), tetraethylene glycol (21), hexylene glycol and thiodiglycol; glycol ethers, such as ethylene glycol monobutyl ether (9), diethylene glycol monoethyl ether, diethylene glycol monobutyl ether (10), triethylene glycol monobutyl ether (10), tetraethylene glycol monobutyl ether (9) and tripropylene glycol monomethyl ether (9); polyalkylene glycols each having a number-average molecular weight of from 200 to 1,000, such as polyethylene glycol having a number-average molecular weight of 200 (19), polyethylene glycol having a number-average molecular weight of 600 (11), polyethylene glycol having a number-average molecular weight of 1,000 (5) and polypropylene glycol; nitrogen-containing compounds, such as 2-pyrrolidone (28), N-methyl-2-pyrrolidone (32), 1-(2-hydroxyethyl)-2-pyrrolidone (38), 1,3-dimethyl-2-imidazolidinone, N-methylmorpholine, urea (110), ethylene urea (50), triethanolamine (32), 1-hydroxymethyl-5,5-dimethylhydantoin (24) and 1,3-bis(2-hydroxyethyl)-5,5-dimethylhydantoin (16); sulfur-containing compounds, such as dimethylsulfoxide (49) and bis(2-hydroxyethylsulfone); and cyclic ethers such as γ-butyrolactone (42), where the numbers in the parentheses represent specific dielectric constants at 25° C. Some of the first water-soluble organic solvents each having a specific dielectric constant of 35 or more to 110 or less may serve as a specific water-soluble hydrocarbon compound.

Water-Soluble Hydrocarbon Compound

It is preferred that the water-soluble organic solvent in the reaction liquid contain a specific water-soluble hydrocarbon compound described later as the one that can be incorporated into an ink. When the specific water-soluble hydrocarbon compound is incorporated into the reaction liquid, cockling and curling of a recording medium having an image recorded thereon can be effectively suppressed. The content (% by mass) of the water-soluble hydrocarbon compound in the reaction liquid is preferably 1.00% by mass or more to 20.00% by mass or less based on the total mass of the ink.

Other Component

The reaction liquid may contain various other components as required. Examples of the other components may include the same examples as those of other components that can be incorporated into the ink to be described later.

Physical Properties of Reaction Liquid

The reaction liquid is an aqueous reaction liquid to be applied to an ink jet system. Accordingly, from the viewpoint of reliability, it is preferred that the physical property values of the reaction liquid be appropriately controlled. Specifically, the surface tension of the reaction liquid at 25° C. is preferably 20 mN/m or more to 60 mN/m or less. In addition, the viscosity of the reaction liquid at 25° C. is preferably 1.0 mPa·s or more to 10.0 mPa·s or less. The pH of the reaction liquid at 25° C. is preferably 5.0 or more to 9.5 or less, more preferably 6.0 or more to 9.0 or less.

Ink

The reaction liquid of the present invention is a liquid to be used in an ink jet recording method together with an aqueous ink. The ink is preferably an aqueous ink for ink jet containing a coloring material. Respective components to be used in the ink and the like are described in detail below.

Coloring Material

The ink preferably includes the coloring material. A pigment or a dye may be used as the coloring material. The content (% by mass) of the coloring material in the ink is preferably 0.50% by mass or more to 15.00% by mass or less, more preferably 1.00% by mass or more to 10.00% by mass or less with respect to the total mass of the ink.

Specific examples of the pigment may include: inorganic pigments, such as carbon black and titanium oxide; and organic pigments, such as azo, phthalocyanine, quinacridone, isoindolinone, imidazolone, diketopyrrolopyrrole and dioxazine pigments. The pigments may be used alone or in combination thereof.

A resin-dispersed pigment using a resin as a dispersant, a self-dispersible pigment, which has a hydrophilic group bonded to its particle surface, or the like may be used as a dispersion system for the pigment. In addition, a resin-bonded pigment having a resin-containing organic group chemically bonded to its particle surface, a microcapsule pigment, which contains a particle whose surface is covered with, for example, a resin, or the like may be used. Pigments different from each other in dispersion system out of those pigments may be used in combination. In the present invention, not a resin-bonded pigment or a microcapsule pigment but a resin-dispersed pigment having a resin serving as a dispersant, the resin being caused to physically adsorb to its particle surface, is preferably used.

A dispersant that can disperse the pigment in an aqueous medium through the action of an anionic group is preferably used as a resin dispersant for dispersing the pigment in the aqueous medium. A resin having an anionic group may be used as the resin dispersant and such a resin as described later, in particular, a water-soluble resin is preferably used. The mass ratio of the content (% by mass) of the pigment in the ink to the content (% by mass) of the resin dispersant therein is preferably 0.3 times or more to 10.0 times or less.

A pigment having an anionic group, such as a carboxylic acid group, a sulfonic acid group or a phosphonic acid group, bonded to its particle surface directly or through any other atomic group (—R—) may be used as the self-dispersible pigment. The anionic group may be any one of an acid type or a salt type. When the group is a salt type, the group may be in any one of a state in which part of the group dissociates or a state in which the entirety thereof dissociates. When the anionic group is a salt type, examples of a cation serving as a counterion may include an alkali metal cation, ammonium and an organic ammonium. Specific examples of the other atomic group (—R—) may include: a linear or branched alkylene group having 1 to 12 carbon atoms; an arylene group, such as a phenylene group or a naphthylene group; a carbonyl group; an imino group; an amide group; a sulfonyl group; an ester group; and an ether group. In addition, groups obtained by combining those groups may be adopted.

A dye having an anionic group is preferably used as the dye. Specific examples of the dye may include dyes, such as azo, triphenylmethane, (aza)phthalocyanine, xanthene and anthrapyridone dyes. The dyes may be used alone or in combination thereof. The coloring material is preferably a pigment, more preferably a resin-dispersed pigment or a self-dispersible pigment.

Resin

A resin may be incorporated into the ink. The use of the ink including the resin can record an image improved in abrasion resistance. The content (% by mass) of the resin in the ink is preferably 0.10% by mass or more to 20.00% by mass or less, more preferably 0.50% by mass or more to 15.00% by mass or less with respect to the total mass of the ink. The resin may be added to the ink (i) for stabilizing the dispersed state of the pigment, that is, as a resin dispersant or an aid therefor. In addition, the resin may be added to the ink (ii) for improving the various characteristics of an image to be recorded. Examples of the form of the resin may include a block copolymer, a random copolymer, a graft copolymer and a combination thereof. In addition, the resin may be a water-soluble resin that can be dissolved in an aqueous medium or may be a resin particle to be dispersed in the aqueous medium. The resins may be used alone or in combination thereof.

Composition of Resin

Examples of the resin may include an acrylic resin, a urethane-based resin and an olefin-based resin. Of those, an acrylic resin and a urethane-based resin are preferred and an acrylic resin including a unit derived from (meth)acrylic acid or a (meth)acrylate is more preferred.

A resin having a hydrophilic unit and a hydrophobic unit as its structural units is preferred as the acrylic resin. Of those, a resin having a hydrophilic unit derived from (meth) acrylic acid and a hydrophobic unit derived from at least one selected from a group consisting of a monomer having an aromatic ring and a (meth)acrylic acid ester-based monomer is preferred. A resin having a hydrophilic unit derived from (meth)acrylic acid and a hydrophobic unit derived from at least one selected from a group consisting of a monomer styrene and α-methylstyrene is particularly preferred. Those resins may each be suitably utilized as a resin dispersant for dispersing the pigment because the resins each easily cause an interaction with the pigment.

The hydrophilic unit is a unit having a hydrophilic group such as an anionic group. The hydrophilic unit may be formed by, for example, polymerizing a hydrophilic monomer having a hydrophilic group. Specific examples of the hydrophilic monomer having a hydrophilic group may include: acidic monomers each having a carboxylic acid group, such as (meth)acrylic acid, itaconic acid, maleic acid and fumaric acid; and anionic monomers, such as anhydrides and salts of these acidic monomers. A cation for forming the salt of the acidic monomer may be, for example, a lithium, sodium, potassium, ammonium or organic ammonium ion. The hydrophobic unit is a unit free of a hydrophilic group such as an anionic group. The hydrophobic unit may be formed by, for example, polymerizing the hydrophobic monomer free of a hydrophilic group such as anionic group. Specific examples of the hydrophobic monomer may include: monomers each having an aromatic ring, such as styrene, α-methylstyrene and benzyl (meth)acrylate; and (meth)acrylic acid ester-based monomers, such as methyl (meth)acrylate, butyl (meth)acrylate and 2-ethylhexyl (meth)acrylate.

The urethane-based resin may be obtained by, for example, causing a polyisocyanate and a polyol to react with each other. In addition, a chain extender may be further caused to react with the reaction product. Examples of the olefin-based resin may include polyethylene and polypropylene.

Properties of Resin

The phrase "resin is water-soluble" as used herein means that when the resin is neutralized with an alkali whose amount is equivalent to its acid value, the resin is present in an aqueous medium under a state in which the resin does not form any particle whose particle diameter may be measured by a dynamic light scattering method. Whether or not the resin is water-soluble can be judged in accordance with the following method. First, a liquid (resin solid content: 10% by mass) containing the resin neutralized with an alkali (e.g., sodium hydroxide or potassium hydroxide) corresponding to its acid value is prepared. Next, the prepared liquid is diluted with pure water tenfold (on a volume basis) to prepare a sample solution. Then, when no particle having a particle diameter is measured at the time of the measurement of the particle diameter of the resin in the sample solution by the dynamic light scattering method, the resin can be judged to be water-soluble. Measurement conditions at this time may be set, for example, as follows: SetZero: 30 seconds; number of times of measurement: 3; and measurement time: 180 seconds. In addition, a particle size analyzer based on the dynamic light scattering method (e.g., an analyzer available under the product name "UPA-EX150" from Nikkiso Co., Ltd.) or the like may be used as a particle size distribution measuring device. Of course, the particle size distribution measuring device to be used, the measurement conditions and the like are not limited to the foregoing.

The acid value of the water-soluble resin is preferably 100 mgKOH/g or more to 250 mgKOH/g or less. The weight-average molecular weight of the water-soluble resin is preferably 3,000 or more to 15,000 or less.

The acid value of a resin for forming the resin particle is preferably 5 mgKOH/g or more to 100 mgKOH/g or less. The weight-average molecular weight of the resin for forming the resin particle is preferably 1,000 or more to 3,000,000 or less, more preferably 100,000 or more to 3,000,000 or less. The volume-based 50% cumulative particle diameter $(D_{50})$ of the resin particle measured by a dynamic light scattering method is preferably 50 nm or more to 500 nm or less. The volume-based 50% cumulative particle diameter of the resin particle is the diameter of the particle in a particle diameter cumulative curve at which the ratio of the particle integrated from small particle diameters reaches 50% with respect to the total volume of the measured particle. The volume-based 50% cumulative particle diameter of the resin particle may be measured with the above-mentioned particle size analyzer of a dynamic light scattering system and under the above-mentioned measurement conditions. The glass transition temperature of the resin particle is preferably 40° C. or more to 120° C. or less, more preferably 50° C. or more to 100° C. or less. The glass transition temperature (° C.) of the resin particle may be measured with a differential scanning calorimeter (DSC). The resin particle does not need to include any coloring material.

Wax Particle

A particle formed of a wax (wax particle) may be incorporated into the ink. The use of the ink including the wax particle can record an image further improved in abrasion resistance. The wax in this specification may be a composition blended with a component except the wax or may be the wax itself. The wax particle may be dispersed with a dispersant, such as a surfactant or a resin. The waxes may be used alone or in combination thereof. The content (% by mass) of the wax particle in the ink is preferably 1.00% by mass or more to 10.00% by mass or less, more preferably 1.00% by mass or more to 5.00% by mass or less with respect to the total mass of the ink.

The wax is an ester of a higher monohydric or dihydric alcohol that is insoluble in water and a fatty acid in a narrow sense. Accordingly, animal-based waxes and plant-based waxes are included in the category of the wax but oils and fats are not included therein. High-melting point fats, mineral-based waxes, petroleum-based waxes and blends and modified products of various waxes are included therein in a broad sense. In the present invention, the waxes in a broad sense may each be used without any particular limitation. The waxes in a broad sense may be classified into natural waxes, synthetic waxes, blends thereof (blended waxes) and modified products thereof (modified waxes).

Examples of the natural wax may include: animal-based waxes, such as beeswax, a spermaceti wax and lanolin; plant-based waxes, such as a Japan wax, a carnauba wax, a sugar cane wax, a palm wax, a candelilla wax and a rice wax; mineral-based waxes such as a montan wax; and petroleum-based waxes, such as a paraffin wax, a microcrystalline wax and petrolatum. Examples of the synthetic wax may include hydrocarbon-based waxes, such as a Fischer-Tropsch wax and polyolefin waxes (e.g., polyethylene wax and polypropylene wax). The blended waxes are mixtures of the above-mentioned various waxes. The modified waxes are obtained by subjecting the above-mentioned various waxes to modification treatment, such as oxidation, hydrogenation, alcohol modification, acrylic modification or urethane modification. The above-mentioned waxes may be used alone or in combination thereof. The wax is preferably at least one kind selected from the group consisting of: a microcrystalline wax; a Fischer-Tropsch wax; a polyolefin wax; a paraffin wax; and modified products and blends thereof. Of those, a blend of a plurality of kinds of waxes is more preferred and a blend of a petroleum-based wax and a synthetic wax is particularly preferred.

The wax is preferably a solid at normal temperature (25° C.). The melting point (° C.) of the wax is preferably 40° C. or more to 120° C. or less, more preferably 50° C. or more to 100° C. or less. The melting point of the wax may be measured in conformity with a test method described in the section 5.3.1 (Melting Point Testing Method) of JIS K 2235:1991 (Petroleum Waxes). In the cases of a microcrystalline wax, petrolatum and a mixture of a plurality of kinds of waxes, their melting points may be measured with higher accuracy by utilizing a test method described in the section 5.3.2 thereof. The melting point of the wax is susceptible to characteristics, such as a molecular weight (a larger molecular weight provides a higher melting point), a molecular structure (a linear structure provides a higher melting point but a branched structure provides a lower melting point), crystallinity (higher crystallinity provides a higher melting point) and a density (a higher density provides a higher melting point). Accordingly, the control of those characteristics can provide a wax having a desired melting point. The melting point of the wax in the ink may be measured, for example, as follows: after the wax fractionated by subjecting the ink to ultracentrifugation treatment has been washed and dried, its melting point is measured in conformity with each of the above-mentioned test methods.

Aqueous Medium

The ink is an aqueous ink including at least water as an aqueous medium. An aqueous medium that is the water or a mixed solvent of the water and a water-soluble organic solvent may be incorporated into the ink. Deionized water or ion-exchanged water is preferably used as the water. The content (% by mass) of the water in the aqueous ink is preferably 50.00% by mass or more to 95.00% by mass or less with respect to the total mass of the ink. In addition, the content (% by mass) of the water-soluble organic solvent in the aqueous ink is preferably 2.00% by mass or more to 40.00% by mass or less with respect to the total mass of the ink. Solvents that may be used in an ink for ink jet, such as alcohols, (poly)alkylene glycols, glycol ethers, nitrogen-containing solvents and sulfur-containing solvents, may each be used as the water-soluble organic solvent. The water-soluble organic solvents may be used alone or in combination thereof.

Water-Soluble Hydrocarbon Compound

The water-soluble organic solvent to be incorporated into the ink preferably contains a specific water-soluble hydrocarbon compound. The water-soluble hydrocarbon compound is a compound having a hydrocarbon chain having 3 or more carbon atoms, the compound being substituted with 2 or more hydrophilic groups each selected from the group consisting of: a hydroxy group; an amino group; and an anionic group. However, the hydrocarbon chain may be interrupted by a sulfonyl group or an ether group. When the number of the carbon atoms of the hydrocarbon chain is 3 or 4, the hydrophilic groups include an anionic group or the hydrocarbon chain is interrupted by a sulfonyl group.

In the present invention, a hydrocarbon compound in the state of being dissolved in water at a content of the compound in the ink at 25° C. is defined as being "water-soluble". That is, the solubility of the compound in water at 25° C. is larger than the content thereof in the ink. The fact that the hydrocarbon chain is interrupted by a sulfonyl group or an ether group means that a sulfonyl group $(-S(=O)_2-)$ or an ether group $(-O-)$ is present in the middle of the hydrocarbon chain. The water-soluble hydrocarbon compound has hydrogen-bonding groups, such as a hydroxy group, an amino group, an anionic group, a sulfonyl group and an ether group. Accordingly, the use of the ink including the hydrocarbon compound can suppress the cockling or curl of a recording medium having recorded thereon an image. A general hydrocarbon compound having a hydrocarbon chain having a relatively small number of carbon atoms (3 or 4 carbon atoms) tends to have a small molecular weight and hence have a low vapor pressure. However, the above-mentioned water-soluble hydrocarbon compound has a hydrogen-bonding anionic group or its hydrocarbon chain is interrupted by a sulfonyl group. Accordingly, the compound hardly evaporates owing to an intermolecular or intramolecular interaction and hence remains between fibers for forming the recording medium to exhibit a suppressing action on the cockling or the curl. The content (% by mass) of the water-soluble hydrocarbon compound in the ink is preferably 1.00% by mass or more to 20.00% by mass or less with respect to the total mass of the ink.

The number of the carbon atoms of the hydrocarbon chain for forming the water-soluble hydrocarbon compound is preferably 3 or more to 50 or less, more preferably 3 or more to 10 or less. Examples of the anionic group may include a sulfonic acid group and a carboxylic acid group. Specific examples of the water-soluble hydrocarbon compound may include: alkanediols, such as 1,5-pentanediol and 1,6-hexanediol; amino acids, such as alanine, β-alanine, trim-ethylglycine, amidosulfuric acid (alias: sulfamic acid), ami-nomethanesulfonic acid, taurine (alias: 2-aminoethanesulfonic acid), carbamic acid, glycine, aspartic acid, glutamic acid, sulfanilic acid or salts of any of the acids described above, phenylalanine, leucine, isoleucine, threonine, tryptophan, valine, methionine, lysine and argi-nine; sulfonyl compounds such as bis(2-hydroxyethyl) sulfone; alkylene glycols, such as triethylene glycol, tetra-ethylene glycol, tripropylene glycol and a polyethylene glycol having a number-average molecular weight of from about 200 to about 1,000; and sugars, such as sorbitol, D-sorbitol, xylitol, trehalose, fructose and D(+)-xylose. The water-soluble hydrocarbon compounds may be used alone or in combination thereof. Some of the specific water-soluble hydrocarbon compounds may serve as the first water-soluble organic solvent having a specific dielectric constant of 35 or more to 110 or less.

Other Component

The ink may include various additives, such as an anti-foaming agent, a surfactant, a pH adjustor, a viscosity modifier, a rust inhibitor, an antiseptic, a fungicide, an antioxidant and an anti-reducing agent, as required in addition to the above-mentioned components. However, the ink is preferably free of the reactant to be used in the reaction liquid as described above.

Physical Properties of Ink

The ink is an aqueous ink to be applied to an ink jet system. Accordingly, from the viewpoint of reliability, it is preferred that the physical property values of the ink be appropriately controlled. Specifically, the surface tension of the ink at 25° C. is preferably 20 mN/m or more to 60 mN/m or less. In addition, the viscosity of the ink at 25° C. is preferably 1.0 mPa·s or more to 10.0 mPa·s or less. The pH of the ink at 25° C. is preferably 7.0 or more to 9.5 or less, more preferably 8.0 or more to 9.5 or less.

Ink Jet Recording Method and Ink Jet Recording Apparatus

An ink jet recording method (hereinafter also simply referred to as "recording method") of the present invention is a method including recording an image on a recording medium with an aqueous ink and an aqueous reaction liquid containing a reactant that reacts with the aqueous ink. The recording method of the present invention includes applying the reaction liquid to the recording medium and applying the aqueous ink to the recording medium so that the aqueous ink overlaps at least part of a region of the recording medium having the reaction liquid applied thereto. In addition, the reaction liquid is the above-mentioned reaction liquid. An ink jet recording method according to an embodiment of the present invention and an ink jet recording apparatus that may be suitably used in the ink jet recording method are described below with reference to the drawings.

FIG. 1 is a schematic view for illustrating an example of the schematic configuration of an ink jet recording apparatus 100 of this embodiment. The ink jet recording apparatus 100 is an ink jet recording apparatus that records an image on a recording medium with a reaction liquid containing a reactant that reacts with an ink and the ink. Herein, description is given by taking a case in which the reaction liquid is used together with the ink as an example. An X-direction, a Y-direction and a Z-direction represent the width direction (total length direction), depth direction and height direction of the ink jet recording apparatus, respectively. The recording medium is conveyed in the X-direction.

The ink jet recording apparatus 100 of the embodiment illustrated in FIG. 1 includes: a recording portion 1000; a heating portion 2000; a fixing portion 3000; and a sheet delivery portion 4000. In the recording portion 1000, various liquids are applied to a recording medium 1100, which has been conveyed from a sheet feeding device 1400 by a conveying member 1300, by a liquid applying device 1200. In the heating portion 2000, the liquid components of an image formed by the liquids applied to the recording medium 1100 are evaporated and dried by heating with a heating device 2100. In the fixing portion 3000, a fixing member 3100 is brought into contact with the region of the recording medium 1100 including the image to heat the image, to thereby accelerate the fixation of the image to the recording medium 1100. After that, the recording medium 1100 is conveyed by the conveying member 4100 of the sheet delivery portion 4000 and is loaded and stored in a recording medium storage portion 4200. Herein, description is given by taking a configuration including the heating portion 2000 and the fixing portion 3000 as an example. However, the heating portion or the fixing portion may be omitted in accordance with recording conditions (e.g., the kinds of the ink and the recording medium and a recording speed). In Examples to be described later, recording was performed without use of the heating portion 2000 and the fixing portion 3000.

Any recording medium may be used as the recording medium 1100. However, a recording medium that is not a fabric but is made of paper or a resin material is preferably used. For example, such recording media each having ink absorbability (permeability) as described below may each be used as the recording medium 1100: a recording medium free of a coating layer, such as plain paper, uncoated paper or synthetic paper; and a recording medium including a coating layer, such as glossy paper or art paper. In addition, a recording medium that does not have permeability like a film or a sheet formed from a resin material, such as polyvinyl chloride (PVC) or polyethylene terephthalate (PET), may be used. The basis weight (g/m$^2$) of the recording medium 1100 is preferably 30 g/m$^2$ or more to 500 g/m$^2$ or less, more preferably 50 g/m$^2$ or more to 450 g/m$^2$ or less.

Recording Portion

The recording portion 1000 includes the liquid applying device 1200. The liquid applying device 1200 includes a reaction liquid applying device 1201 and an ink applying device 1202. The reaction liquid applying device 1201 illustrated in FIG. 1 is an example of a unit using an ejection head of an ink jet system. The reaction liquid applying device may be formed by utilizing a gravure coater, an offset coater, a die coater, a blade coater or the like in addition to the ejection head. The reaction liquid may be applied by the reaction liquid applying device 1201 before the application of the ink or may be applied after the ink application as long as the liquid can be brought into contact with the ink on the recording medium 1100. However, to record a high-quality image on various recording media having different liquid-absorbing characteristics, the reaction liquid is preferably applied before the application of the ink. An ejection head (recording head) of an ink jet system is used as the ink applying device 1202. Examples of the ejection system of the ejection head serving as the liquid applying device 1200 include: a system including causing film boiling in a liquid with an electro-thermal converter to form air bubbles, to thereby eject the liquid; and a system including ejecting the liquid with an electro-mechanical converter.

The liquid applying device 1200 is a line head arranged in the Y-direction in an extended manner and its ejection orifices are arrayed in a range covering the image recording region of the recording medium having the maximum usable width. The ejection head has an ejection orifice surface (not shown) having formed therein ejection orifices on its lower side (recording medium 1100 side). The ejection orifice surface faces the recording medium 1100 with a minute distance of about several millimeters therebetween.

The plurality of ink applying devices 1202 may be arranged for applying inks of respective colors to the recording medium 1100. For example, when respective color images are recorded with a yellow ink, a magenta ink, a cyan ink and a black ink, the four ink applying devices 1202 that eject the above-mentioned four kinds of inks are arranged side by side in the X-direction. The ink and the reaction liquid are hereinafter sometimes collectively referred to as "liquids".

Figure 2:
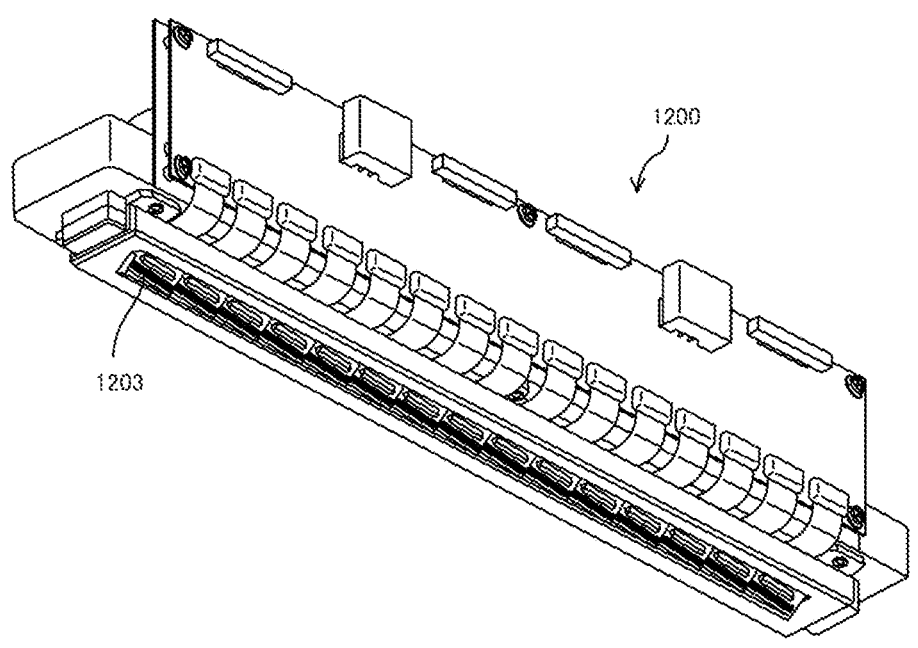
FIG. 2 is a perspective view for illustrating an example of a liquid applying device.

FIG. 2 is a perspective view for illustrating an example of the liquid applying device. The liquid applying device 1200 illustrated in FIG. 2 is a line head and a plurality of ejection element substrates 1203 having arranged therein ejection orifice arrays are linearly arrayed. The ejection element substrates 1203 each have arrayed therein a plurality of ejection orifice arrays.

Conveyance System

As illustrated in FIG. 1, the recording portion 1000 includes the liquid applying device 1200 and the conveying member 1300 that conveys the recording medium 1100. The reaction liquid and the ink are applied to the desired positions of the recording medium 1100, which is conveyed by the conveying member 1300, by the liquid applying device 1200. The respective liquid applying devices receive the image signal of drawing data to apply the required reaction liquid and ink to the respective positions. Although the conveying member 1300 in the form of a conveying belt is illustrated in FIG. 1, for example, a spur or a conveying cylinder may be utilized as long as the spur or the cylinder has a function of conveying the recording medium 1100. A member that can fix the recording medium 1100 may be used as the conveying member 1300 for improving conveyance accuracy. Specific examples thereof may include: an approach including arranging holes in the conveying member 1300 and sucking the recording medium 1100 from its rear surface side to fix the medium; and an approach including forming the conveying member 1300 from an appropriate material and electrostatically adsorbing the recording medium 1100 to fix the medium.

Heating Portion

As illustrated in FIG. 1, the heating portion 2000 includes the heating device 2100 and a conveying member 2200. The recording medium 1100 having recorded thereon the image through the application of the reaction liquid and the ink is heated by the heating device 2100 while being conveyed by the conveying member 2200. Thus, the liquid components of the image are evaporated and dried. The recording method preferably further includes, between the ink applying step and the fixing step, a drying step of subjecting the recording medium having applied thereto the ink to non-contact heating to dry the ink. The presence of such drying step can effectively suppress the deformation (cockling or curl) of the recording medium 1100.

The heating device 2100 may have any configuration as long as the device can heat the recording medium 1100. Conventionally known various devices, such as a warm-air dryer and a heater, may each be used. Of those, a non-contact-type heater, such as a heating wire and an infrared heater, is preferably utilized in terms of safety and energy efficiency. In addition, the utilization of the following mechanism easily improves the drying efficiency: the mechanism has built therein a fan for jetting a heated gas on the recording medium 1100 and blows warm air thereto.

With regard to a method for the heating, the recording medium 1100 may be heated from the side of the surface having applied thereto the reaction liquid and the ink, may be heated from its rear surface side or may be heated from both the surfaces. A heating function may be imparted to the conveying member 2200. Although the conveying member 2200 in the form of a conveying belt is illustrated in FIG. 1, for example, a spur or a conveying cylinder may be utilized as long as the spur or the cylinder has a function of conveying the recording medium 1100.

Fixing Portion

As illustrated in FIG. 1, in the fixing portion 3000, the recording medium 1100 is conveyed by a conveying member 3200. In addition, the fixing member 3100 is brought into contact with the recording medium 1100 under a state in which the medium is pressurized to heat the liquids applied to the recording medium 1100, such as the reaction liquid and the ink. Thus, an image can be fixed to the recording medium 1100. After the permeation of the liquid components of the reaction liquid and the ink into the recording medium 1100 having recorded thereon the image and the evaporation thereof from the recording medium 1100 by their passing through the heating portion 2000, the reaction liquid and the ink are fixed in the fixing portion 3000 to complete the image. When the recording medium 1100 is heated and pressurized under the state of being sandwiched between the fixing member 3100 and the conveying member 3200, the image on the recording medium 1100 and the fixing member 3100 are brought into close contact with each other and hence the image is fixed to the recording medium. When a liquid such as an ink containing the resin particle and a coloring material is used, the resin particle is softened through heating mainly by the fixing portion 3000 to form a film and hence the coloring material can be bound onto the recording medium 1100.

A method of heating the fixing member 3100 may be, for example, a system including arranging a heat source such as a halogen heater in each of rollers that drive the fixing member 3100 serving as a fixing belt to heat the member. In addition, the method may be, for example, a system including arranging a heat source such as an infrared heater at a site different from the fixing member 3100 to heat the member. Further, those systems may be combined with each other.

Sheet Delivery Portion

The recording medium 1100 after the image recording is stored in the sheet delivery portion 4000 (FIG. 1). Specifically, the recording medium 1100 after the recording is conveyed by the conveying member 4100 to be finally stored under the state of being loaded in the recording medium storage portion 4200. The two or more recording medium storage portions 4200 may be arranged for, for example, separately storing different recorded products.

EXAMPLES

The present invention is described in more detail below by way of Examples and Comparative Examples. The present invention is by no means limited to Examples below without departing from the gist of the present invention. "Part(s)" and "%" with regard to the description of the amounts of components are by mass, unless otherwise stated.

Preparation of Surfactant

A 10% aqueous solution of each of surfactants shown in Tables 1-1 and 1-2 were prepared. Each of the surfactants with a remark "Synthesized" was synthesized as described below. 5.5 mol of chlorosulfonic acid was added to a reaction vessel containing 5.0 mol of raw material alcohol having a structure corresponding to a hydrophobic moiety. The mixture was subjected to a reaction under stirring at 40° C. for 40 minutes to synthesize a sulfate ester compound. After the sulfate ester was neutralized by adding a sodium hydroxide aqueous solution, the concentration was adjusted by adding water. Thus, an aqueous solution of an anionic surfactant in which the content of the anionic surfactant was 10% was obtained. In addition, a 10% aqueous solution of a commercially available surfactant diluted with water was prepared.

TABLE 1-1

| | | Surfactant Properties | |
|---|---|---|---|
| Surfactant | Chemical compound name | Hydrophilic moiety (denoted by H type) | Hydrophobic moiety |
| 1 | Sodium 2-methyl-4-pentyl sulfate | Sulfate ester group | 2-Methyl-4-pentyl group |
| 2 | Sodium 2-hexyl sulfate | Sulfate ester group | 2-Hexyl group |
| 3 | Sodium 2-ethyl-1-butyl sulfate | Sulfate ester group | 2-Ethyl-1-butyl group |
| 4 | Sodium 2-ethyl-1-pentyl sulfate | Sulfate ester group | 2-Ethyl-1-pentyl group |
| 5 | Sodium 2-ethyl-1-hexyl sulfate | Sulfate ester group | 2-Ethyl-1-hexyl group |
| 6 | Sodium 3-octyl sulfate | Sulfate ester group | 3-Octyl group |
| 7 | Sodium 4-ethyl-3-octyl sulfate | Sulfate ester group | 4-Ethyl-3-octyl group |
| 8 | Sodium 3-decanyl sulfate | Sulfate ester group | 3-Decanyl group |
| 9 | Potassium laurate | Carboxylic acid group | 1-Dodecyl group |
| 10 | Polyoxyethylene lauryl ether sodium acetate | Carboxylic acid group | 1-Dodecyl group |
| 11 | Laureth-4-phosphoric acid | Phosphoric acid ester group | 1-Dodecyl group |
| 12 | Sodium di-2-ethylhexyl-sulfosuccinate | Sulfosuccinate group | 2-Ethylhexyl group |
| 13 | Sodium 1-octanesulfonate | Sulfonic acid group | 1-Octyl group |
| 14 | Sodium 3-pentyl sulfate | Sulfate ester group | 3-Pentyl group |
| 15 | Sodium 2-hexyl-1-decanyl sulfate | Sulfate ester group | 2-Hexyl-1-decyl group |
| 16 | Sodium 4-heptadecanyl sulfate | Sulfate ester group | 4-Heptadecyl group |
| 17 | Sodium 1-hexyl sulfate | Sulfate ester group | 1-Hexyl group |
| 18 | Sodium 1-octyl sulfate | Sulfate ester group | 1-Octyl group |
| 19 | Sodium polyoxyethylene lauryl ether sulfate | Sulfate ester group | 1-Dodecyl group |
| 20 | Steareth-3-phosphoric acid | Phosphoric acid ester group | 1-Octadecyl group |
| 21 | Acetylene glycol ethylene oxide adduct | Ethylene oxide group | 2,4,7,9-tetramethyl-5-decyl group |
| 22 | Polyoxyethylene lauryl ether | Ethylene oxide group | 1-Dodecyl group |
| 23 | Distearyl dimethyl ammonium chloride | Quaternary ammonium group | 1-Octadecyl group |
| 24 | Sodium perfluoroalkyl ethylene oxide phosphate | Phosphoric acid ester group | Perfluoroalkyl group |
| 25 | Sodium dodecyl benzene sulfonate | Sulfonic acid group | Dodecyl benzene group |
| 26 | Polyether-modified siloxane compound | Ethylene oxide group | Polydimethylsiloxane group |
| 27 | Secondary alcohol ethoxylate | Ethylene oxide group | Octyl group(branched) |

TABLE 1-2

| | | Surfactant Properties | |
|---|---|---|---|
| | | Aliphatic hydrocarbon group | |
| Surfactant | Structure | Number of carbons | Remarks |
| 1 | Branched | 6 | Synthesized |
| 2 | Branched | 6 | Synthesized |
| 3 | Branched | 6 | Synthesized |
| 4 | Branched | 7 | Synthesized |
| 5 | Branched | 8 | Synthesized |
| 6 | Branched | 8 | Synthesized |
| 7 | Branched | 10 | Synthesized |
| 8 | Branched | 10 | Synthesized |
| 9 | Linear | 12 | Potassium laurate(manufactured by FUJIFILM Wako Pure Chemical Co.) |
| 10 | Linear | 12 | Neohytenol ECL-45(product name, manufactured by Dai-ichi Kogyo Seiyaku) |
| 11 | Linear | 12 | Manufactured by Toho Chemical Industry Co. |
| 12 | Branched | 8 | Rapizol A-30 (product name, manufactured by Nichiyu) |
| 13 | Linear | 8 | Manufactured by FUJIFILM Wako Pure Chemical Co. |
| 14 | Branched | 5 | Synthesized |
| 15 | Branched | 16 | Synthesized |
| 16 | Branched | 17 | Synthesized |
| 17 | Linear | 6 | Synthesized |
| 18 | Linear | 8 | Synthesized |
| 19 | Linear | 12 | Sandet EN (product name, manufactured by Sanyo Chemical Industry) |
| 20 | Linear | 18 | Manufactured by Toho Chemical Industry Co. |
| 21 | Branched | 14 | Acetylenol E100 (product name, Kawaken Fine Chemical Co., Ltd.) |
| 22 | Linear | 12 | Emulmin NL-100 (product name, manufactured by Sanyo Chemical Industry) |
| 23 | Linear | 18 | Cation DSV (product name, manufactured by Sanyo Chemical Industry) |
| 24 | — | — | Zonyl UR(product name, manufactured by Sigma-Aldrich) |

TABLE 1-2-continued

| | Surfactant Properties | | |
| --- | --- | --- | --- |
| | Aliphatic hydrocarbon group | | |
| Surfactant | Structure | Number of carbons | Remarks |
| 25 | — | — | Manufactured by FUJIFILM Wako Pure Chemical Co. |
| 26 | — | — | BYK333(product name, manufactured by Bic Chemie) |
| 27 | Branched | 8 | TERGITOL 15-S-5(product name, manufactured by Sigma-Aldrich) |

Preparation of Reaction Liquid

Respective components (unit: %) shown in the upper part of Tables 2-1 to 2-6 were mixed and sufficiently stirred, followed by filtration with a cellulose acetate filter having a pore size of 3.0 μm (manufactured by Advantec) under pressure. Thus, respective reaction liquids were prepared. In Tables 2-1 to 2-6, "Rupasol FG" is a product name of branched polyethyleneimine manufactured by BASF. The numerical value given to polyethylene glycol is a number-average molecular weight. The numerical values in the parentheses for water-soluble organic solvents and water-soluble organic compounds are specific dielectric constants. The characteristics of the reaction liquids are described in the lower part of Tables 2-1 to 2-6.

TABLE 2-1

| | Composition and characteristics of Reaction Liquid | | | | | | | | | |
| --- | --- | --- | --- | --- | --- | --- | --- | --- | --- | --- |
| | Reaction Liquid | | | | | | | | | |
| | 1 | 2 | 3 | 4 | 5 | 6 | 7 | 8 | 9 | 10 |
| Kind of Surfactant | 1 | 2 | 3 | 4 | 5 | 6 | 7 | 8 | 1 | 1 |
| Magnesium sulfate heptahydrate | 25.00 | 25.00 | 25.00 | 25.00 | 25.00 | 25.00 | 25.00 | 25.00 | 25.00 | 25.00 |
| Magnesium nitrate hexahydrate | | | | | | | | | | |
| Magnesium acetate tetrahydrate | | | | | | | | | | |
| Magnesium chloride hexahydrate | | | | | | | | | | |
| Aluminum sulfate anhydride | | | | | | | | | | |
| Calcium nitrate tetrahydrate | | | | | | | | | | |
| Calcium chloride hexahydrate | | | | | | | | | | |
| Malic acid | | | | | | | | | | |
| Rupasol FG | | | | | | | | | | |
| Lithium acetate | | | | | | | | | | |
| Polyethylene glycol 600 (11) | | | | | | | | | | |
| Tetraethylene glycol (23) | | | | | | | | | | |
| 1,5-Pentanediol (27) | | | | | | | | | | |
| 2-Pyrrolidone (28) | | | | | | | | | | |
| Diethylene glycol (32) | | | | | | | | | | |
| Trimethylolpropane (34) | | | | | | | | | | |
| 1-(2-Hydroxyethyl)-2-Pyrrolidone (38) | | | | | | | | | | |
| Glycerin (42) | | | | | | | | | | |
| Trehalose (49) | | | | | | | | | | |
| Xylitol (59) | | | | | | | | | | |
| Sorbitol (59) | 10.00 | 10.00 | 10.00 | 10.00 | 10.00 | 10.00 | 10.00 | 10.00 | 10.00 | 10.00 |
| Urea (110) | | | | | | | | | | |
| Trimethylglycine (213) | | | | | | | | | | |
| Aqueous solution of surfactant | 9.00 | 9.00 | 9.00 | 9.00 | 9.00 | 9.00 | 9.00 | 9.00 | 3.50 | 12.20 |
| Ion-exchanged water | 56.00 | 56.00 | 56.00 | 56.00 | 56.00 | 56.00 | 56.00 | 56.00 | 61.50 | 52.80 |
| Content of the polyvalent metal salt A(%) | 12.21 | 12.21 | 12.21 | 12.21 | 12.21 | 12.21 | 12.21 | 12.21 | 12.21 | 12.21 |
| Content of the specific surfactant B(%) | 0.90 | 0.90 | 0.90 | 0.90 | 0.90 | 0.90 | 0.90 | 0.90 | 0.35 | 1.22 |
| Content of the first water-soluble organic solvent C(%) | 10.00 | 10.00 | 10.00 | 10.00 | 10.00 | 10.00 | 10.00 | 10.00 | 10.00 | 10.00 |
| Value of A/B (times) | 13.6 | 13.6 | 13.6 | 13.6 | 13.6 | 13.6 | 13.6 | 13.6 | 34.9 | 10.0 |

TABLE 2-2

| | Composition and characteristics of Reaction Liquid | | | | | | | | | |
| --- | --- | --- | --- | --- | --- | --- | --- | --- | --- | --- |
| | Reaction Liquid | | | | | | | | | |
| | 11 | 12 | 13 | 14 | 15 | 16 | 17 | 18 | 19 | 20 |
| Kind of Surfactant | 1 | 1 | 1 | 1 | 1 | 1 | 1 | 1 | 9 | 10 |
| Magnesium sulfate heptahydrate | 25.00 | 25.00 | | | | | | | 8.30 | 8.30 |
| Magnesium nitrate hexahydrate | | | 23.50 | | | | | | | |

TABLE 2-2-continued

Composition and characteristics of Reaction Liquid

| | Reaction Liquid | | | | | | | | | |
|---|---|---|---|---|---|---|---|---|---|---|
| | 11 | 12 | 13 | 14 | 15 | 16 | 17 | 18 | 19 | 20 |
| Magnesium acetate tetrahydrate | | | | 20.50 | | | | | | |
| Magnesium chloride hexahydrate | | | | | 29.00 | | | | | |
| Aluminum sulfate anhydride | | | | | | 13.60 | | | | |
| Calcium nitrate tetrahydrate | | | | | | | 19.50 | | | |
| Calcium chloride hexahydrate | | | | | | | | 26.80 | | |
| Malic acid | | | | | | | | | | |
| Rupasol FG | | | | | | | | | | |
| Lithium acetate | | | | | | | | | | |
| Polyethylene glycol 600 (11) | | | | | | | | | | |
| Tetraethylene glycol (23) | | | | | | | | | | |
| 1,5-Pentanediol (27) | | | | | | | | | | |
| 2-Pyrrolidone (28) | | | | | | | | | | |
| Diethylene glycol (32) | | | | | | | | | | |
| Trimethylolpropane (34) | | | | | | | | | | |
| 1-(2-Hydroxyethyl)-2-Pyrrolidone (38) | | | | | | | | | | |
| Glycerin (42) | | | | | | | | | | |
| Trehalose (49) | | | | | | | | | | |
| Xylitol (59) | | | | | | | | | | |
| Sorbitol (59) | 10.00 | 10.00 | 10.00 | 10.00 | 10.00 | 10.00 | 10.00 | 10.00 | 10.00 | 10.00 |
| Urea (110) | | | | | | | | | | |
| Trimethylglycine (213) | | | | | | | | | | |
| Aqueous solution of surfactant | 6.10 | 5.90 | 10.00 | 10.00 | 10.00 | 10.00 | 10.00 | 10.00 | 3.00 | 3.00 |
| Ion-exchanged water | 58.90 | 59.10 | 56.50 | 59.50 | 51.00 | 66.40 | 60.50 | 53.20 | 78.70 | 78.70 |
| Content of the polyvalent metal salt A(%) | 12.21 | 12.21 | 13.59 | 13.61 | 13.58 | 13.60 | 13.55 | 13.58 | 4.05 | 4.05 |
| Content of the specific surfactant B(%) | 0.61 | 0.59 | 1.00 | 1.00 | 1.00 | 1.00 | 1.00 | 1.00 | 0.30 | 0.30 |
| Content of the first water-soluble organic solvent C(%) | 10.00 | 10.00 | 10.00 | 10.00 | 10.00 | 10.00 | 10.00 | 10.00 | 10.00 | 10.00 |
| Value of A/B (times) | 20.0 | 20.7 | 13.6 | 13.6 | 13.6 | 13.6 | 13.6 | 13.6 | 13.5 | 13.5 |

TABLE 2-3

Composition and characteristics of Reaction Liquid

| | Reaction Liquid | | | | | | | | | |
|---|---|---|---|---|---|---|---|---|---|---|
| | 21 | 22 | 23 | 24 | 25 | 26 | 27 | 28 | 29 | 30 |
| Kind of Surfactant | 11 | 12 | 13 | 14 | 15 | 16 | 17 | 18 | 19 | 1 |
| Magnesium sulfate heptahydrate | 8.30 | 25.00 | 25.00 | 25.00 | 25.00 | 25.00 | 25.00 | 25.00 | 8.30 | 25.00 |
| Magnesium nitrate hexahydrate | | | | | | | | | | |
| Magnesium acetate tetrahydrate | | | | | | | | | | |
| Magnesium chloride hexahydrate | | | | | | | | | | |
| Aluminum sulfate anhydride | | | | | | | | | | |
| Calcium nitrate tetrahydrate | | | | | | | | | | |
| Calcium chloride hexahydrate | | | | | | | | | | |
| Malic acid | | | | | | | | | | |
| Rupasol FG | | | | | | | | | | |
| Lithium acetate | | | | | | | | | | |
| Polyethylene glycol 600 (11) | | | | | | | | | | |
| Tetraethylene glycol (23) | | | | | | | | | | |
| 1,5-Pentanediol (27) | | | | | | | | | | |
| 2-Pyrrolidone (28) | | | | | | | | | | |
| Diethylene glycol (32) | | | | | | | | | | |
| Trimethylolpropane (34) | | | | | | | | | | 20.00 |
| 1-(2-Hydroxyethyl)-2-Pyrrolidone (38) | | | | | | | | | | |
| Glycerin (42) | | | | | | | | | | |
| Trehalose (49) | | | | | | | | | | |
| Xylitol (59) | | | | | | | | | | |
| Sorbitol (59) | 10.00 | 10.00 | 10.00 | 10.00 | 10.00 | 10.00 | 10.00 | 10.00 | 10.00 | |
| Urea (110) | | | | | | | | | | |
| Trimethylglycine (213) | | | | | | | | | | |
| Aqueous solution of surfactant | 3.00 | 9.00 | 9.00 | 9.00 | 9.00 | 9.00 | 9.00 | 9.00 | 3.00 | 9.00 |
| Ion-exchanged water | 78.70 | 56.00 | 56.00 | 56.00 | 56.00 | 56.00 | 56.00 | 56.00 | 78.70 | 46.00 |
| Content of the polyvalent metal salt A(%) | 4.05 | 12.21 | 12.21 | 12.21 | 12.21 | 12.21 | 12.21 | 12.21 | 4.05 | 12.21 |
| Content of the specific surfactant B(%) | 0.30 | 0.90 | 0.90 | 0.90 | 0.90 | 0.90 | 0.90 | 0.90 | 0.30 | 0.90 |
| Content of the first water-soluble organic solvent C(%) | 10.00 | 10.00 | 10.00 | 10.00 | 10.00 | 10.00 | 10.00 | 10.00 | 10.00 | 0.00 |
| Value of A/B (times) | 13.5 | 13.6 | 13.6 | 13.6 | 13.6 | 13.6 | 13.6 | 13.6 | 13.5 | 13.6 |

TABLE 2-4

Composition and characteristics of Reaction Liquid

| | Reaction Liquid | | | | | | | | | |
|---|---|---|---|---|---|---|---|---|---|---|
| | 31 | 32 | 33 | 34 | 35 | 36 | 37 | 38 | 39 | 40 |
| Kind of Surfactant | 1 | 1 | 1 | 1 | 1 | 1 | 1 | 1 | 1 | 1 |
| Magnesium sulfate heptahydrate | 25.00 | 25.00 | 25.00 | 25.00 | 25.00 | 25.00 | 25.00 | 25.00 | 25.00 | 25.00 |
| Magnesium nitrate hexahydrate | | | | | | | | | | |
| Magnesium acetate tetrahydrate | | | | | | | | | | |
| Magnesium chloride hexahydrate | | | | | | | | | | |
| Aluminum sulfate anhydride | | | | | | | | | | |
| Calcium nitrate tetrahydrate | | | | | | | | | | |
| Calcium chloride hexahydrate | | | | | | | | | | |
| Malic acid | | | | | | | | | | |
| Rupasol FG | | | | | | | | | | |
| Lithium acetate | | | | | | | | | | |
| Polyethylene glycol 600 (11) | | | | | | | | | | |
| Tetraethylene glycol (23) | | | | | | | | | | |
| 1,5-Pentanediol (27) | | | | | | | | | | |
| 2-Pyrrolidone (28) | | | | | | | | | | |
| Diethylene glycol (32) | | | | | | | | | | |
| Trimethylolpropane (34) | | | | | | | | | | |
| 1-(2-Hydroxyethyl)-2-Pyrrolidone (38) | 20.00 | | | | | | | | | |
| Glycerin (42) | | | | | | | | 10.00 | | |
| Trehalose (49) | | | | | | | | | 20.00 | |
| Xylitol (59) | | | | | | | | | | 20.00 |
| Sorbitol (59) | | | | 9.00 | 10.00 | 30.00 | 31.00 | | | |
| Urea (110) | | 20.00 | | | | | | | | |
| Trimethylglycine (213) | | | 20.00 | | | | | | | |
| Aqueous solution of surfactant | 9.00 | 9.00 | 9.00 | 9.00 | 9.00 | 9.00 | 9.00 | 9.00 | 9.00 | 9.00 |
| Ion-exchanged water | 46.00 | 46.00 | 46.00 | 57.00 | 56.00 | 36.00 | 35.00 | 56.00 | 46.00 | 46.00 |
| Content of the polyvalent metal salt A(%) | 12.21 | 12.21 | 12.21 | 12.21 | 12.21 | 12.21 | 12.21 | 12.21 | 12.21 | 12.21 |
| Content of the specific surfactant B(%) | 0.90 | 0.90 | 0.90 | 0.90 | 0.90 | 0.90 | 0.90 | 0.90 | 0.90 | 0.90 |
| Content of the first water-soluble organic solvent C(%) | 20.00 | 20.00 | 0.00 | 9.00 | 10.00 | 30.00 | 31.00 | 10.00 | 20.00 | 20.00 |
| Value of A/B (times) | 13.6 | 13.6 | 13.6 | 13.6 | 13.6 | 13.6 | 13.6 | 13.6 | 13.6 | 13.6 |

TABLE 2-5

Composition and characteristics of Reaction Liquid

| | Reaction Liquid | | | | | | | | | |
|---|---|---|---|---|---|---|---|---|---|---|
| | 41 | 42 | 43 | 44 | 45 | 46 | 47 | 48 | 49 | 50 |
| Kind of Surfactant | 1 | 1 | 1 | 20 | 1 | — | 21 | 22 | 23 | 24 |
| Magnesium sulfate heptahydrate | 25.00 | 25.00 | 25.00 | | | 25.00 | 25.00 | 25.00 | 25.00 | 25.00 |
| Magnesium nitrate hexahydrate | | | | | | | | | | |
| Magnesium acetate tetrahydrate | | | | | | | | | | |
| Magnesium chloride hexahydrate | | | | | | | | | | |
| Aluminum sulfate anhydride | | | | | | | | | | |
| Calcium nitrate tetrahydrate | | | | 6.00 | | | | | | |
| Calcium chloride hexahydrate | | | | | | | | | | |
| Malic acid | | | | | 13.00 | | | | | |
| Rupasol FG | | | | | | | | | | |
| Lithium acetate | | | | | | | | | | |
| Polyethylene glycol 600 (11) | | | 3.00 | | | | | | | |
| Tetraethylene glycol (23) | | | | | | | | | | |
| 1,5-Pentanediol (27) | | | | | | | | | | |
| 2-Pyrrolidone (28) | | | | | | | | | | |
| Diethylene glycol (32) | | | | | | | | | | |
| Trimethylolpropane (34) | | | | | 9.00 | | | | | |
| 1-(2-Hydroxyethyl)-2-Pyrrolidone (38) | | | | | | | | | | |
| Glycerin (42) | | 10.00 | 10.00 | | | | | | | |
| Trehalose (49) | | | | | | | | | | |
| Xylitol (59) | | | | | | | | | | |
| Sorbitol (59) | 20.00 | | | | 10.00 | 10.00 | 10.00 | 10.00 | 10.00 | 10.00 |
| Urea (110) | | | | | | | | | | |
| Trimethylglycine (213) | | 3.00 | | | | | | | | |
| Aqueous solution of surfactant | 9.00 | 9.00 | 9.00 | 2.00 | 14.00 | 0.00 | 9.00 | 9.00 | 9.00 | 9.00 |
| Ion-exchanged water | 46.00 | 53.00 | 53.00 | 83.00 | 63.00 | 65.00 | 56.00 | 56.00 | 56.00 | 56.00 |
| Content of the polyvalent metal salt A(%) | 12.21 | 12.21 | 12.21 | 4.17 | 0.00 | 12.21 | 12.21 | 12.21 | 12.21 | 12.21 |
| Content of the specific surfactant B(%) | 0.90 | 0.90 | 0.90 | 0.20 | 1.40 | 0.00 | 0.00 | 0.00 | 0.00 | 0.00 |

TABLE 2-5-continued

Composition and characteristics of Reaction Liquid

| | Reaction Liquid | | | | | | | | | |
|---|---|---|---|---|---|---|---|---|---|---|
| | 41 | 42 | 43 | 44 | 45 | 46 | 47 | 48 | 49 | 50 |
| Content of the first water-soluble organic solvent C(%) | 20.00 | 10.00 | 10.00 | 0.00 | 10.00 | 10.00 | 10.00 | 10.00 | 10.00 | 10.00 |
| Value of A/B (times) | 13.6 | 13.6 | 13.6 | 20.9 | 0.0 | — | — | — | — | — |

TABLE 2-6

Composition and characteristics of Reaction Liquid

| | Reaction Liquid | | | | | | | |
|---|---|---|---|---|---|---|---|---|
| | 51 | 52 | 53 | 54 | 55 | 56 | 57 | 58 |
| Kind of Surfactant | 25 | 26 | 1 | 1 | 13 27 | 13 27 | 21 | 21 |
| Magnesium sulfate heptahydrate | 25.00 | 25.00 | 25.00 | 25.00 | | | 2.00 | |
| Magnesium nitrate hexahydrate | | | | | | | | |
| Magnesium acetate tetrahydrate | | | | | | | | |
| Magnesium chloride hexahydrate | | | | | | | | |
| Aluminum sulfate anhydride | | | | | | | | |
| Calcium nitrate tetrahydrate | | | | | 3.50 | 3.50 | | 21.80 |
| Calcium chloride hexahydrate | | | | | | | | |
| Malic acid | | | | | | | | |
| Rupasol FG | | | | | 3.50 | 3.50 | | |
| Lithium acetate | | | | | | | | 0.30 |
| Polyethylene glycol 600 (11) | | | | | | | | 17.30 |
| Tetraethylene glycol (23) | | | | | 6.00 | 6.00 | | |
| 1,5-Pentanediol (27) | | | | | 10.00 | 10.00 | | |
| 2-Pyrrolidone (28) | | | | | 4.00 | 4.00 | | |
| Diethylene glycol (32) | | | | | | | 10.00 | |
| Trimethylolpropane (34) | | | | | | | | |
| 1-(2-Hydroxyethyl)-2-Pyrrolidone (38) | | | | | | | | |
| Glycerin (42) | | | | | | | 10.00 | 17.30 |
| Trehalose (49) | | | | | | | | |
| Xylitol (59) | | | | | | | | |
| Sorbitol (59) | 10.00 | 10.00 | 10.00 | 10.00 | | | | |
| Urea (110) | | | | | | | | |
| Trimethylglycine (213) | | | | | | | | |
| Aqueous solution of surfactant | 9.00 | 9.00 | 13.00 | 3.40 | 2.60 12.50 | 2.60 12.50 | 5.00 | 6.00 |
| Ion-exchanged water | 56.00 | 56.00 | 52.00 | 61.60 | 57.90 | 57.90 | 73.00 | 37.30 |
| Content of the polyvalent metal salt A(%) | 12.21 | 12.21 | 12.21 | 12.21 | 2.43 | 2.43 | 0.98 | 15.15 |
| Content of the specific surfactant B(%) | 0.00 | 0.00 | 1.30 | 0.34 | 0.26 | 0.26 | 0.00 | 0.00 |
| Content of the first water-soluble organic solvent C(%) | 10.00 | 10.00 | 10.00 | 10.00 | 0.00 | 0.00 | 10.00 | 17.30 |
| Value of A/B (times) | — | — | 9.4 | 35.9 | 9.3 | 9.3 | — | — |

Preparation of Pigment Dispersion Liquid

Pigment Dispersion Liquid 1

A styrene-ethyl acrylate-acrylic acid copolymer (resin 1) having an acid value of 150 mgKOH/g and a weight-average molecular weight of 8,000 was prepared. 20.0 Parts of the resin 1 was neutralized with potassium hydroxide whose molar amount was equivalent to its acid value. In addition, an appropriate amount of pure water was added to the neutralized product to prepare an aqueous solution of the resin 1 in which the content of the resin (solid content) was 20.00%. 20.0 Parts of a pigment (carbon black), 50.0 parts of the aqueous solution of the resin 1 and 30.0 parts of ion-exchanged water were mixed to provide a mixture. The resultant mixture was subjected to 50 passes of dispersion treatment with a nanomizer (manufactured by Yoshida Kikai Co., Ltd.) at a pressure of 150 MPa. After that, the treated product was centrifuged at a number of revolutions of 5,000 rpm for 30 minutes so that a coarse particle was removed.

The residue was filtered with a cellulose acetate filter having a pore size of 3.0 μm (manufactured by Advantec) under pressure to prepare a pigment dispersion liquid 1 in which the content of the pigment was 20.00% and the content of the resin dispersant (resin 1) was 10.00%.

Pigment Dispersion Liquid 2

A pigment dispersion liquid 2 in which the content of a pigment (C.I. Pigment Blue 15:3) was 10.00% and the content of a resin dispersant (resin 1) was 3.00% was prepared by the same procedure as that of the above-mentioned pigment dispersion liquid 1 except that the pigment was changed to C.I. Pigment Blue 15:3.

Pigment Dispersion Liquid 3

A pigment dispersion liquid 3 in which the content of a pigment (solid solution) was 10.00% and the content of a resin dispersant (resin 1) was 3.00% was prepared by the same procedure as that of the above-mentioned pigment dispersion liquid 1 except that the pigment was changed to a solid solution containing C.I. Pigment Violet 19 and C.I. Pigment Red 122.

Pigment Dispersion Liquid 4

A pigment dispersion liquid 4 in which the content of a pigment (C.I. Pigment Red 150) was 10.00% and the content of a resin dispersant (resin 1) was 3.00% was prepared by the same procedure as that of the above-mentioned pigment dispersion liquid 1 except that the pigment was changed to C.I. Pigment Red 150.

Pigment Dispersion Liquid 5

A pigment dispersion liquid 5 in which the content of a pigment (C.I. Pigment Yellow 74) was 10.00% and the content of a resin dispersant (resin 1) was 3.00% was prepared by the same procedure as that of the above-mentioned pigment dispersion liquid 1 except that the pigment was changed to C.I. Pigment Yellow 74.

Pigment Dispersion Liquid 6

A solution obtained by dissolving 5.0 g of concentrated hydrochloric acid in 5.5 g of water was brought into the state of being cooled to 5° C., followed by the addition of 1.5 g of 4-aminophthalic acid to the solution. A container containing the solution was loaded into an ice bath, and while the solution was stirred so that its temperature was held at 10° C. or less, a solution obtained by dissolving 0.9 g of sodium nitrite in 9.0 g of ion-exchanged water at 5° C. was added thereto. After the mixture had been stirred for 15 minutes, 6.0 g of carbon black was added to the mixture under stirring and the whole was further stirred for 15 minutes to provide a slurry. The resultant slurry was filtered with filter paper (product name: "STANDARD FILTER PAPER No. 2," manufactured by Advantec), and particles remaining on the filter paper were sufficiently washed with water and dried in an oven at 110° C. After that, a sodium ion was substituted with a potassium ion by an ion exchange method. Thus, a self-dispersion pigment in which a —$C_6H_3$—$(COOK)_2$ group was bonded to the particle surface of the pigment was obtained. An appropriate amount of pure water was added to adjust the content of the pigment.

Thus, a pigment dispersion liquid 6 in which the content of the pigment was 20.00% was obtained.

Preparation of Resin Particle

Resin Particle 1

74.0 Parts of ion-exchanged water and 0.2 part of potassium persulfate were loaded into a four-necked flask including a stirrer, a reflux condenser and a nitrogen gas introduction pipe, followed by mixing. In addition, 24.0 parts of ethyl methacrylate, 1.5 parts of methacrylic acid and 0.3 part of a reactive surfactant (product name "ADEKA REASOAP ER-20", manufactured by Adeka Corporation) were mixed to prepare an emulsion. Under a nitrogen atmosphere, the prepared emulsion was dropped into the above-mentioned four-necked flask over 1 hour and was subjected to a polymerization reaction for 2 hours while the mixture was stirred at 80° C. After the resultant had been cooled to 25° C., ion-exchanged water and an aqueous solution containing potassium hydroxide whose molar amount was equivalent to the acid value of a resin particle were added. Thus, a water dispersion liquid of the resin particle in which the content of the resin particle (solid content) was 25.00% was prepared.

Preparation of Ink

Respective components (unit: %) shown in Table 3 were mixed and sufficiently stirred, followed by filtration with a cellulose acetate filter having a pore size of 3.0 μm (manufactured by Advantec) under pressure. Thus, respective inks were prepared. In Table 3, "Surfynol 465" is a product name of a surfactant (an ethylene oxide adduct of acetylene glycol) manufactured by Nissin Chemical Industry Co., Ltd. In addition, "NIKKOL BL-4.2" is a product name of a surfactant (polyoxyethylene lauryl ether, the number of moles added of ethylene oxide groups is 4.2) manufactured by Nikko Chemicals Co., Ltd.

TABLE 3

| | | | | Composition of ink | | | |
|---|---|---|---|---|---|---|---|
| | | | | Ink | | | |
| | 1 | 2 | 3 | 4 | 5 | 6 | 7 |
| Pigment dispersion liquid 1 | 20.00 | | | | | | |
| Pigment dispersion liquid 2 | | 20.00 | | | | | |
| Pigment dispersion liquid 3 | | | 15.00 | | | | |
| Pigment dispersion liquid 4 | | | 5.00 | | | | |
| Pigment dispersion liquid 5 | | | | 20.00 | | | |
| Pigment dispersion liquid 6 | | | | | 20.00 | | 15.00 |
| C.I. Direct Blue 199 | | | | | | 4.00 | |
| Water dispersion of resin particle | 40.00 | 40.00 | 40.00 | 40.00 | 40.00 | 40.00 | |
| Glycerin | 20.00 | 20.00 | 20.00 | 20.00 | 20.00 | 20.00 | |
| Diethylene glycol | | | | | | | 20.00 |
| Isopropanol | | | | | | | 5.00 |
| Surfynol 465 | 0.50 | 0.50 | 0.50 | 0.50 | 0.50 | 0.50 | 0.20 |
| NIKKOL BL-4.2 | | | | | | | 0.25 |
| Ion-exchanged water | 19.50 | 19.50 | 19.50 | 19.50 | 19.50 | 35.50 | 59.55 |

Evaluations

The reaction liquids and the inks in combination shown in Tables 4-1 and 4-2 were each loaded into the reaction liquid applying device 1201 and the ink applying device 1202 of the ink jet recording apparatus 100 having a configuration illustrated in FIG. 1. In the ink jet recording apparatus 100, an image recorded under the following conditions is defined as having a recording duty of 100%: one ink droplet having a mass of 3.0 ng is applied to a unit region measuring $1/1,200$ inch by $1/1,200$ inch. Coated paper (product name "OK TopKote+", manufactured by Oji Paper Co., Ltd.) was used as a recording medium. In the present invention, in evaluation criteria for each of the following items, while levels "AAA", "AA", "A" and "B" were defined as acceptable levels, a level "C" was defined as an unacceptable level. The evaluation results are shown in Tables 4-1 and 4-2.

Image Quality

A solid image measuring 20 cm by 20 cm, the image having a reaction liquid recording duty of 15% and an ink recording duty of 100%, was recorded on 10 sheets of a recording medium with the ink jet recording apparatus 100 having the above-mentioned configuration. The recorded solid images were visually observed, and the image quality thereof was evaluated in accordance with the following evaluation criteria.

A: In one of the 10 solid images, a difference in density was observed in part of the image.

B: In two of the 10 solid images, a difference in density was observed in part of the image.

C: In three or more of the 10 solid images, a difference in density was observed in part of the image.

Intermittent Ejection Stability

A solid image (reference image) measuring 5 cm by 20 cm, the image having a reaction liquid recording duty of 15% and an ink recording duty of 100%, was recorded on a recording medium with the ink jet recording apparatus 100 having the above-mentioned configuration. Then, after suspension for a predetermined period of time, a solid image (image for evaluation) was recorded on a recording medium under the same conditions as those of the reference image.

In each of the two types of recorded images, a portion having a width of 3 cm from a recording start position was read with a scanner (product name "DR-C225II", manufactured by Canon, Inc.) and the area ratio (%) of a portion recorded in accordance with input data (the dark portion of the image) was calculated by subjecting the solid image to binarization processing. The reading was performed under such a condition that a color mode and a resolution of 600 dpi. The binarization processing was performed as follows: the image was converted into 8-bit data with image processing software "ImageJ"; and then the value of $[(255+Gtop)/2]$ was set as a threshold for a gradation value (Gtop) at the peak of a brightness histogram in which a white color corresponded to 255 and a black color corresponded to 0. The ratio (area ratio) of an area having a gradation value equal to or more than the threshold thus obtained was calculated and the case of an area ratio of 99.0% or more was determined to be as follows: "image unevenness due to a reduction in intermittent ejection stability does not occur." The intermittent ejection stability of the reaction liquid was evaluated from the ejection suspension time in which image unevenness occurred on the image for evaluation in accordance with the following evaluation criteria.

AAA: The area ratio was 99.5% or more and image unevenness did not occur even after suspension for 240 seconds.

AA: The area ratio was 99.0% or more to less than 99.5% and image unevenness did not occur even after suspension for 240 seconds.

A: The ejection suspension time in which image unevenness occurred was 120 seconds or more to less than 240 seconds.

B: The ejection suspension time in which image unevenness occurred was 60 seconds or more to less than 120 seconds.

C: The ejection suspension time in which image unevenness occurred was less than 60 seconds.

Ejection Stability

A solid image measuring 5 cm by 20 cm, the image having a reaction liquid recording duty of 15% and an ink recording duty of 100%, was recorded on 1,000 sheets of a recording medium with the ink jet recording apparatus 100 having the above-mentioned configuration. the central portion of each of the solid images on the first sheet and the 1,000th sheet out of the recorded images was read with a scanner (product name "DR-C225II", manufactured by Canon Inc.) and the area ratio (%) of a portion recorded in accordance with input data (the dark portion of the image) was calculated by subjecting the solid image to binarization processing. The reading was performed under such a condition that the read image had a color and a resolution of 600 dpi. The binarization processing was performed as follows: the image was converted into 8-bit data with image processing software "ImageJ"; and then the value of $[(255+Gtop)/2]$ was set as a threshold for a gradation value (Gtop) at the peak of a brightness histogram in which a white color corresponded to 255 and a black color corresponded to 0. The ratio (area ratio) of an area having a gradation value equal to or more than the threshold thus obtained was calculated and a ratio (1,000th sheet/first sheet) of area ratios in the first and 1,000th recorded products was calculated, and the ejection stability of the reaction liquid in accordance with the following evaluation criteria was evaluated.

A: The "ratio of area ratios" was 0.990 times or more.

B: The "ratio of area ratios" was less than 0.990 times.

TABLE 4-1

| | | Evaluation conditions and results | | | | |
|---|---|---|---|---|---|---|
| | | | | | Evaluation result | |
| | | Ink set | | | Intermittent | |
| | | Reaction liquid | Ink | Image Quality | Ejection Stability | Ejection Stability |
| Example | 1 | 1 | 1 | A | AAA | A |
| | 2 | 2 | 1 | A | AAA | A |
| | 3 | 3 | 1 | A | AAA | A |
| | 4 | 4 | 1 | A | AAA | A |
| | 5 | 5 | 1 | A | AAA | A |
| | 6 | 6 | 1 | A | AAA | A |
| | 7 | 7 | 1 | A | AAA | A |
| | 8 | 8 | 1 | A | AAA | A |
| | 9 | 9 | 1 | A | AA | A |
| | 10 | 10 | 1 | A | AAA | A |
| | 11 | 11 | 1 | A | AAA | A |
| | 12 | 12 | 1 | A | AA | A |
| | 13 | 13 | 1 | A | AAA | B |
| | 14 | 14 | 1 | A | AAA | B |
| | 15 | 15 | 1 | A | AAA | B |
| | 16 | 16 | 1 | A | AA | A |
| | 17 | 17 | 1 | A | AA | B |
| | 18 | 18 | 1 | A | AA | B |
| | 19 | 19 | 1 | A | B | A |
| | 20 | 20 | 1 | A | B | A |
| | 21 | 21 | 1 | A | B | A |
| | 22 | 22 | 1 | A | AA | A |

TABLE 4-1-continued

| | | | | Evaluation result | |
| | Ink set | | | Intermittent | |
| | Reaction liquid | Ink | Image Quality | Ejection Stability | Ejection Stability |
|---|---|---|---|---|---|
| 23 | 23 | 1 | A | A | A |
| 24 | 24 | 1 | A | AA | A |
| 25 | 25 | 1 | A | AAA | A |
| 26 | 26 | 1 | A | AA | A |
| 27 | 27 | 1 | A | AA | A |
| 28 | 28 | 1 | A | AA | A |
| 29 | 29 | 1 | A | AA | A |
| 30 | 30 | 1 | A | A | A |
| 31 | 31 | 1 | A | AA | A |
| 32 | 32 | 1 | A | AA | A |

TABLE 4-2

Evaluation conditions and results

| | | | | Evaluation result | |
| | Ink set | | | Intermittent | |
| | Reaction liquid | Ink | Image Quality | Ejection Stability | Ejection Stability |
|---|---|---|---|---|---|
| Example 33 | 33 | 1 | A | A | A |
| 34 | 34 | 1 | A | AA | A |
| 35 | 35 | 1 | A | AAA | A |
| 36 | 36 | 1 | A | AAA | A |
| 37 | 37 | 1 | A | AA | A |
| 38 | 38 | 1 | A | AA | A |
| 39 | 39 | 1 | A | AAA | A |
| 40 | 40 | 1 | A | AAA | A |
| 41 | 41 | 1 | A | AAA | A |
| 42 | 42 | 1 | A | AA | A |
| 43 | 43 | 1 | A | AA | A |
| 44 | 1 | 2 | A | AAA | A |
| 45 | 1 | 3 | A | AAA | A |
| 46 | 1 | 4 | A | AAA | A |
| 47 | 1 | 5 | A | AAA | A |
| 48 | 1 | 6 | A | AA | A |
| 49 | 44 | 6 | A | B | B |
| Comparative 1 | 45 | 1 | C | AAA | A |
| Example 2 | 46 | 1 | C | AAA | A |
| 3 | 47 | 1 | A | C | A |
| 4 | 48 | 1 | A | C | A |
| 5 | 49 | 1 | A | C | A |
| 6 | 50 | 1 | A | C | A |
| 7 | 51 | 1 | A | C | A |
| 8 | 52 | 1 | A | C | A |
| 9 | 53 | 1 | A | C | A |
| 10 | 54 | 1 | B | C | A |
| 11 | 55 | 1 | A | C | B |
| 12 | 56 | 6 | A | C | B |
| 13 | 57 | 7 | A | C | B |
| 14 | 58 | 1 | A | C | B |

When the intermittent ejection stability was compared between Example 1 and Example 10, Example 1 was relatively excellent.

In addition, through use of each of the reaction liquids of Examples 38, 42 and 43 and the ink 1, the following evaluation was performed. A solid image having a reaction liquid recording duty of 15% and an ink recording duty of 100% was recorded on an entire surface of an A4-size recording medium with the ink jet recording apparatus 100 having the above-mentioned configuration. The obtained recorded product was left to stand under an environment of a temperature of 25° C. and a relative humidity of 50% for 24 hours, and then the deformation (state of curling) of an end portion of the recording medium was visually recognized. As a result, in the recorded products of Examples 42 and 43 each using the reaction liquid containing the "water-soluble hydrocarbon compound", curling of the recording medium was relatively suppressed as compared to the recorded product of Example 38 using the reaction liquid that did not contain the "water-soluble hydrocarbon compound."

According to the present invention, the reaction liquid for ink jet, which can record a high-quality image and is excellent in intermittent ejection stability, to be used together with an aqueous ink can be provided. In addition, the ink jet recording method using the reaction liquid can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-188255, filed Nov. 25, 2022, Japanese Patent Application No. 2022-188256, filed Nov. 25, 2022, and Japanese Patent Application No 2023-185683, filed Oct. 30, 2023, which are hereby incorporated by reference herein in their entirety.

What is claimed is:

1. A reaction liquid for ink jet to be used in an ink jet recording method including recording an image on a recording medium by ejecting with an aqueous ink and an aqueous reaction liquid containing a reactant that reacts with the aqueous ink from a recording head,
the reaction liquid comprising:
a polyvalent metal salt; and
a surfactant,
wherein the surfactant is a compound including a hydrophilic moiety having an anionic group and a hydrophobic moiety that is an aliphatic hydrocarbon group, wherein the aliphatic hydrocarbon group is an alkyl group having 6 or more to 16 or less carbon atoms, and
wherein a mass ratio of a content (% by mass) of the polyvalent metal salt in the reaction liquid to a content (% by mass) of the surfactant therein is 10.0 times or more to 35.0 times or less.

2. The reaction liquid according to claim 1, wherein the mass ratio of the content (% by mass) of the polyvalent metal salt in the reaction liquid to the content (% by mass) of the surfactant therein is 10.0 times or more to 20.0 times or less.

3. The reaction liquid according to claim 1, wherein the polyvalent metal salt is a sulfuric acid salt of a polyvalent metal.

4. The reaction liquid according to claim 1, wherein the polyvalent metal salt is a magnesium salt.

5. The reaction liquid according to claim 1, wherein the anionic group is one of a sulfonic acid group or a sulfate ester group.

6. The reaction liquid according to claim 1, wherein the anionic group is a sulfate ester group.

7. The reaction liquid according to claim 1, wherein the aliphatic hydrocarbon group is an alkyl group having a branched structure.

8. The reaction liquid according to claim 1, further comprising a first water-soluble organic solvent having a specific dielectric constant of 35 or more to 110 or less.

9. The reaction liquid according to claim 8, wherein a content (% by mass) of the first water-soluble organic solvent in the reaction liquid is 10.00% by mass or more to 30.00% by mass or less based on a total mass of the reaction liquid.

10. An ink jet recording method comprising recording an image on a recording medium by ejecting an aqueous ink and an aqueous reaction liquid containing a reactant that reacts with the aqueous ink from a recording head, the ink jet recording method comprising:

applying the reaction liquid to the recording medium; and applying the aqueous ink to the recording medium so that the aqueous ink overlaps at least part of a region of the recording medium having the reaction liquid applied thereto, wherein the reaction liquid is the reaction liquid of claim 1.

11. The reaction liquid according to claim 1, wherein the content (% by mass) of the polyvalent metal salt in the reaction liquid is 1.00% by mass or more to 20.00% by mass or less with respect to the total mass of the reaction liquid.

12. The reaction liquid according to claim 1, wherein the content (% by mass) of the anionic surfactant in the reaction liquid is 0.20% by mass or more to 3.00% by mass or less with respect to the total mass of the reaction liquid.

13. The reaction liquid according to claim 1, wherein the polyvalent metal ion is at least one selected from the group consisting of a magnesium sulfate, a magnesium nitrate, a magnesium acetate, a magnesium chloride, an aluminum sulfate, a calcium nitrate, and a calcium chloride.

14. The reaction liquid according to claim 1, wherein the polyvalent metal ion is a magnesium sulfate.

15. The reaction liquid according to claim 1, wherein the anionic surfactant is an alkyl sulfate.

16. The reaction liquid according to claim 8, wherein the first water-soluble organic solvent is at least one selected from the group consisting of 1-(2-hydroxyethyl)-2-pyrrolidone, glycerin, trehalose, xylitol, sorbitol, and urea.

\* \* \* \* \*